(12) United States Patent
Sood

(10) Patent No.: US 7,941,491 B2
(45) Date of Patent: May 10, 2011

(54) SYSTEM AND METHOD FOR DYNAMIC ADAPTIVE USER-BASED PRIORITIZATION AND DISPLAY OF ELECTRONIC MESSAGES

(75) Inventor: Manish Chander Sood, Airmont, NY (US)

(73) Assignee: MessageMind, Inc., New York, NY (US)

( * ) Notice: Subject to any disclaimer, the term of this patent is extended or adjusted under 35 U.S.C. 154(b) by 1306 days.

(21) Appl. No.: 11/144,428

(22) Filed: Jun. 3, 2005

(65) Prior Publication Data
US 2006/0010217 A1    Jan. 12, 2006

Related U.S. Application Data

(60) Provisional application No. 60/576,937, filed on Jun. 4, 2004, provisional application No. 60/577,107, filed on Jun. 4, 2004, provisional application No. 60/577,238, filed on Jun. 4, 2004.

(51) Int. Cl.
*G06F 15/16* (2006.01)
(52) U.S. Cl. ........................................ 709/206; 709/207
(58) Field of Classification Search .................. 709/204, 709/206, 207
See application file for complete search history.

(56) References Cited

U.S. PATENT DOCUMENTS

| | | | | |
|---|---|---|---|---|
| 5,377,354 | A * | 12/1994 | Scannell et al. | 718/103 |
| 5,694,616 | A * | 12/1997 | Johnson et al. | 709/207 |
| 5,999,932 | A |   12/1999 | Paul | |
| 6,161,130 | A |   12/2000 | Horvitz et al. | |
| 6,182,059 | B1 |  1/2001 | Angotti et al. | |
| 6,351,764 | B1 * | 2/2002 | Voticky et al. | 709/207 |
| 6,396,513 | B1 * | 5/2002 | Helfman et al. | 715/752 |
| 6,442,593 | B1 * | 8/2002 | Wang et al. | 709/206 |
| 6,513,026 | B1 |  1/2003 | Horvitz et al. | |
| 6,601,012 | B1 |  7/2003 | Horvitz et al. | |

(Continued)

FOREIGN PATENT DOCUMENTS
WO    WO-01/69432 A2    9/2001

OTHER PUBLICATIONS

Hasegawa et al.; Automatic Priority Assignment to E-mail Messages Based on Information Extraction and Users Action History; Springer-Verlag Berlin Heidelberg 2000; pp. 573-582.*

(Continued)

*Primary Examiner* — Rupal D Dharia
*Assistant Examiner* — Jimmy H Tran
(74) *Attorney, Agent, or Firm* — Gibbons P.C.; Richard J. Katz, Esq.

(57) ABSTRACT

A method and system that dynamically ranks electronic messages based on their situational and inherent dimensions, which are judged by a set of filters. These filters evaluate the different elemental metadata constituting a message and produce a priority value based on filters relevance and importance. The system iterates through queued messages, examine the structured content for expected attributes, statistically analyze unstructured content, apply dynamically weighted rules and policies to deliver a priority ranking, and then display the message and its vital attributes in accordance with the priority ranking. The system also adaptive learns and adjusts its weighted rules and policies to permit priority ranking to change on real-time or interval-based (may be user-defined) schedule. The system includes a GUI for increasing reading and processing efficiency. The GUI performs supervised and unsupervised learning from the user's behaviors, and displays messages in accordance with their priority classification.

30 Claims, 24 Drawing Sheets

U.S. PATENT DOCUMENTS

| | | | |
|---|---|---|---|
| 6,622,160 B1 * | 9/2003 | Horvitz | 709/206 |
| 6,654,781 B1 | 11/2003 | Browning | |
| 6,654,787 B1 | 11/2003 | Aronson et al. | |
| 6,654,791 B1 * | 11/2003 | Bates et al. | 709/207 |
| 6,708,205 B2 | 3/2004 | Sheldon et al. | |
| 6,714,967 B1 * | 3/2004 | Horvitz | 709/206 |
| 6,842,775 B1 * | 1/2005 | Chastain et al. | 709/207 |
| 6,871,217 B2 * | 3/2005 | Voticky et al. | 709/207 |
| 6,925,605 B2 * | 8/2005 | Bates et al. | 715/745 |
| 7,007,067 B1 * | 2/2006 | Azvine et al. | 709/206 |
| 7,120,865 B1 * | 10/2006 | Horvitz et al. | 715/210 |
| 7,194,681 B1 * | 3/2007 | Horvitz | 715/236 |
| 7,233,954 B2 * | 6/2007 | Horvitz | 1/1 |
| 7,337,181 B2 * | 2/2008 | Horvitz | 1/1 |
| 7,444,384 B2 * | 10/2008 | Horvitz | 709/207 |
| 7,464,093 B2 * | 12/2008 | Horvitz | 1/1 |
| 7,565,403 B2 * | 7/2009 | Horvitz et al. | 709/206 |
| 2002/0054117 A1 * | 5/2002 | van Dantzich et al. | 345/766 |
| 2002/0065884 A1 * | 5/2002 | Donoho et al. | 709/204 |
| 2002/0087649 A1 | 7/2002 | Horvitz | |
| 2002/0099681 A1 * | 7/2002 | Gainey et al. | 707/1 |
| 2002/0107925 A1 | 8/2002 | Goldschneider et al. | |
| 2002/0120702 A1 | 8/2002 | Schiavone et al. | |
| 2002/0120705 A1 | 8/2002 | Schiavone et al. | |
| 2002/0133557 A1 | 9/2002 | Winarski | |
| 2002/0156859 A1 | 10/2002 | Wang et al. | |
| 2002/0161862 A1 * | 10/2002 | Horvitz | 709/220 |
| 2003/0009385 A1 | 1/2003 | Tucciarone et al. | |
| 2003/0014490 A1 * | 1/2003 | Bates et al. | 709/206 |
| 2003/0020749 A1 * | 1/2003 | Abu-Hakima et al. | 345/752 |
| 2003/0046421 A1 * | 3/2003 | Horvitz et al. | 709/238 |
| 2003/0093483 A1 | 5/2003 | Allen et al. | |
| 2003/0131063 A1 | 7/2003 | Breck | |
| 2003/0140088 A1 | 7/2003 | Robinson et al. | |
| 2003/0172291 A1 | 9/2003 | Judge et al. | |
| 2003/0182383 A1 | 9/2003 | He | |
| 2003/0187937 A1 * | 10/2003 | Yao et al. | 709/206 |
| 2003/0195937 A1 * | 10/2003 | Kircher et al. | 709/207 |
| 2003/0229717 A1 | 12/2003 | Teague | |
| 2003/0233419 A1 | 12/2003 | Beringer | |
| 2004/0015557 A1 * | 1/2004 | Horvitz | 709/206 |
| 2004/0019637 A1 | 1/2004 | Goodman et al. | |
| 2004/0019645 A1 | 1/2004 | Goodman et al. | |
| 2004/0030753 A1 | 2/2004 | Horvitz | |
| 2004/0039786 A1 * | 2/2004 | Horvitz et al. | 709/207 |
| 2004/0073617 A1 | 4/2004 | Milliken et al. | |
| 2004/0078446 A1 * | 4/2004 | Daniell et al. | 709/206 |
| 2004/0098462 A1 * | 5/2004 | Horvitz et al. | 709/207 |
| 2004/0128353 A1 * | 7/2004 | Goodman et al. | 709/204 |
| 2004/0128359 A1 * | 7/2004 | Horvitz et al. | 709/207 |
| 2004/0139160 A1 | 7/2004 | Wallace et al. | |
| 2004/0139165 A1 | 7/2004 | McMillan et al. | |
| 2004/0143636 A1 * | 7/2004 | Horvitz et al. | 709/207 |
| 2004/0153512 A1 * | 8/2004 | Friend | 709/206 |
| 2004/0172457 A1 * | 9/2004 | Horvitz | 709/207 |
| 2004/0172483 A1 * | 9/2004 | Horvitz | 709/240 |
| 2005/0138133 A1 * | 6/2005 | Voticky et al. | 709/207 |
| 2005/0204002 A1 * | 9/2005 | Friend | 709/206 |
| 2005/0204009 A1 * | 9/2005 | Hazarika et al. | 709/206 |
| 2005/0251560 A1 * | 11/2005 | Horvitz | 709/206 |
| 2009/0119385 A1 * | 5/2009 | Horvitz | 709/207 |

OTHER PUBLICATIONS

Deng et al., P@rty: A Personal Email Agent, Dept. of Computer Science Information Engineering, National University of Taiwan, 4 pages.

Bälter et al., Bifrost Inbox Organizer: Giving users control over the inbox, 20 pages.

Appriver, Quick, Lasting and Risk-Free Spam Solutions, http://www.appriver.com/te_over.asp, last visited Aug. 9, 2004, 3 pages.

Spam Police, http://www.fatpipeinc.com/spampolice/, last visited Aug. 9, 2004, 2 pages.

MessageLabs, http://www.massagelabs.com/us/here/anti-spam.asp?C=BAC-HAD-ML, last visited Aug. 9, 2004, 2 pages.

Refining E-Mail Messages from: Internet Complete, Copyright 1998, 1022 pp. 96-97.

Katie Hafner, Delete: Bathwater.Undelete: Baby., http://www.nytimes.com/2004/08/05/technology/circuits/05filt.html?th=&pagewanted=print..., last visited Aug. 5, 2004, 4 pages.

* cited by examiner

SYSTEM AND METHOD FOR DYNAMIC ADAPTIVE USER-BASED PRIORITIZATION AND DISPLAY OF ELECTRONIC MESSAGES

CLAIM OF PRIORITY

This application claims the benefit of priority under 35 U.S.C. §119(e) of U.S. Provisional Application No. 60/576,937, filed Jun. 4, 2004, titled "System and Method for Processing Electronic Messages and Viewing Results Thereof," U.S. Provisional Application No. 60/577,238, filed Jun. 4, 2004, titled "Dynamic Prioritization and Displaying of Queued Messages," and U.S. Provisional Application No. 60/577,107, filed Jun. 4, 2004, titled "Dynamic Adaptive User-Based Prioritization of Electronic Messages." Each of these priority provisional applications are hereby incorporated by reference in their entirety.

FIELD OF INVENTION

The present invention relates to electronic message processing and prioritization, and in particular to a prioritization system and methodology that designates a ranking of electronic messages.

BACKGROUND OF THE INVENTION

Various types of electronic message formats are available for communicating information among distributed computers for the purpose of topical discussion or topical informational sharing. This may include Voice Mail, Electronic Mail, Instant Message conversations, alerts, meeting requests and confirmations, task assignments, organization-wide document search and web search results.

Currently, people spend a considerable amount of time to read, manage, and process the increasing number of electronic messages they receive from a wide variety of sources. It is often impossible to give the same attention to each of these messages. Most of the computer software in charge of the management of messages displays basic information—which might be compared to an envelope in a mailbox. However, a large amount of information that might help the recipient to identify whether a message is important or not is not visible by looking at the envelope (this may include source, destination, intermediate paths, and sensitivity of the electronic message). Indeed, most of the crucial information of a letter is in the letter itself. A typical email user is usually forced to select or double-click on a message to see its content (or full content), one message at a time. In one of the embodiments, both the summarized content, and the security context of several messages arranged in a prioritized visual display fashion, are presented to the user at the same time In conventional methods, the value associated and therefore the order for further processing is based on limited number of attributes such as the source and the time of delivery. The coupling of these attributes is then used to sort the order in which these messages are displayed for analysis and/or processing. In the prior art, the sorted order of messages is typically not the order in which a typical user arranges his or her priorities. A paradox results; while intended to make a user's interaction easier and increase his/her productivity, the existing art ignores or fails to systematically account for the human cognitive behavior of document processing, or what a specific user is doing mentally as they decide what messages within a message queue are worth pursuing.

In the prior art a limited consideration is made to Inherent Priority with loose analysis on Situational Priority (terms defined below). This results in a false and inaccurate prioritization as compared to the actual or desired perception of the recipient.

However, in order to gain productivity, the requirement of most electronic message users is to process messages according to their own relevance and importance needs (including individual's own logic, interest, work culture and policies, user schedule and work habits). This will vary over a period of time and will widely differ from one user to another. In one of the embodiments, the.

Further, missing from the art is a system that learns from, and adapts itself to, a user's prioritization needs. Such a system has increased system accuracy and reliability as compared to the static cognitive models. The present invention can satisfy one or more of these and other needs.

SUMMARY OF THE INVENTION

The present invention relates to adaptive, user-based prioritization of electronic messages. In accordance with one aspect of the invention, a message queue is monitored for the receipt of an electronic message. The historical information and content analysis of the received electronic message is parsed, and statistical data is extracted from the message. Filter analysis is performed on the extracted data and a message prioritization score is calculated. Multiple received messages are displayed in an order based on their respective prioritization score. Feedback of a user interaction with the electronic messaging system is analyzed and to learn the user's behavior so as to adapt the message parsing and filter analysis. The adapted message parsing and filter analysis is used to recalculate the prioritization score.

Embodiments are disclosed which provide systems and methods for dynamically ordering messages by priority, introducing an algorithm that can be integrated with any existing art message clients or can be an independent message client by itself. This ordering is accomplished by carefully analyzing the different message attributes a recipient may use to categorize and prioritize the message. Taking these attributes as an input, a unique priority value representing a message can be computed so that a set of messages can be ranked.

A second embodiment seeks to provide a simple user interface that displays all the information required to process most of the messages without opening them (i.e., without viewing their entire body/content).

Another embodiment will improve the message management experience from an end-user perspective by increasing message reading and analysis productivity, improving response effectiveness and ultimately reducing the time & effort spent reviewing large volume of electronic messages.

In another embodiment, a dynamic message prioritization system adaptively learns by assigning weight to rules in proportion to their signal strength and time.

The application of these embodiments can be extended to any kind of electronic message: Electronic Mail, Instant Message conversations, alerts, meeting requests and confirmations, task assignments, Voice mail, organization-wide document search and web search results These and other aspects, features, steps and advantages can be further appreciated from the accompanying figures and description of certain illustrative embodiments.

BRIEF DESCRIPTION OF THE DRAWING FIGURES

DETAILED DESCRIPTION OF THE ILLUSTRATIVE EMBODIMENTS

By way of overview and introduction, presented and described are embodiments of a dynamically adaptive electronic message prioritization system that displays electronic messages based on a user's prioritization. In one embodiment, the system dynamically orders messages by priority using an algorithm that can be integrated with any existing art message clients. The system can be an independent message client by itself. This ordering is accomplished by carefully analyzing the different message attributes a recipient may use to categorize and prioritize the message. Taking these attributes as an input, a unique priority value representing a message can be computed so that a set of messages can be ranked.

Figure 1:
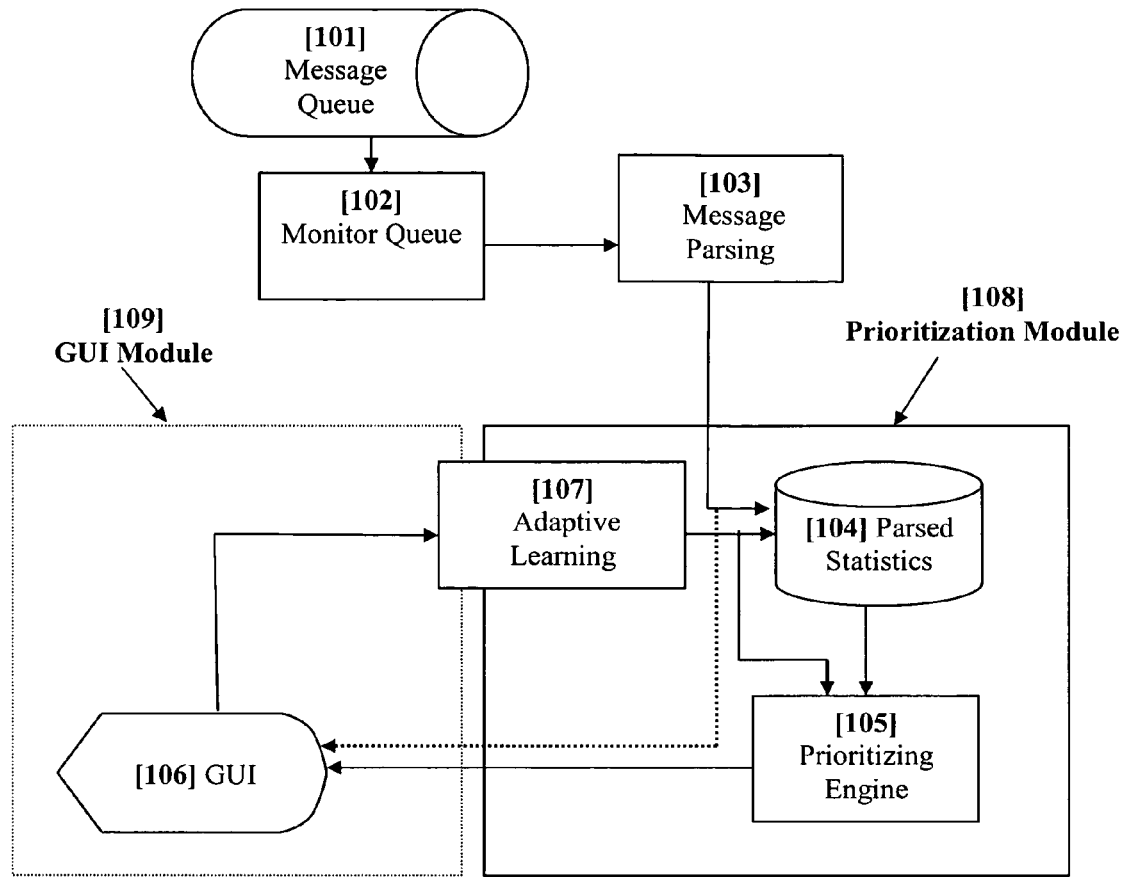
FIG. 1 illustrates an embodiment of a system for dynamic prioritization and displaying of queued messages.

Embodiments of the invention can be characterized by one or more of the following points:

a) A method of prioritizing and organizing unstructured electronic messages based on both content (Inherent) and contextual (Situational) analysis.

b) A message management process comprising receiving a message and presenting a user-friendly interface for indicating a message importance and value with respect to historically evaluated rules and policies.

c) A model and implementation method for determining message priority, including decisions based on at least one of message relevance and message importance.

d) A system and method of a learning module that observes end-user behavior and induces patterns in re-prioritization behavior; wherein the patterns can be used to adjust existing prioritization logic or add new logic.

e) Adaptation of the message prioritization scheme over time, based on actions taken by individuals and actions taken by groups of individuals categorized by type or work organization. Individual end-users therefore benefit not only from learning derived from their own ongoing use of the product but also from work done by other users.

f) A graphical user interface that facilitates the user's reading and processing efficiency, work planning and understanding of user's work behavior.

g) A graphical user interface that facilitates re-prioritization of messages and message components to adapt to the changing user priorities With reference to FIG. 1, an embodiment of a system for dynamic prioritization and displaying of queued messages is depicted. A method utilizing this embodiment includes the steps of monitoring the queued messages for new or removed messages [101] and [102]; new messages are processed and analyzed [103]. Example: If the user has set up some junk or spam filtering rules for managing his/her existing art email, the current embodiment will incorporate these rules in its prioritization as well. The analysis [103] results in numerous data points that are stored in a historical repository. This data is also fed to the Prioritization Engine [105]. Keywords and key sentences along with contextual information are sent as a message summary to the GUI [106].

The repository serves as data collection to which prioritization algorithmic methods can be applied [104]. The prioritization method uses the data in conjunction with weighted rules to rank the message [105]. If the message has been removed from the message queue, its reference is removed from the ranking; however, the historical data as related with this message is not removed from the system. The message is then displayed on a GUI (Graphical User Interface) in accordance with the rank assigned by the prioritization methodology [106]. The user interface displays statistical and summarized information regarding each message with an objective to increase the user's (message recipient's) productivity. These informational points then can be reclassified (i.e., the value of the signal strength can be modified) through a user interface framework and methodology [106] (supervised and unsupervised learning) to feed back information to an Adaptive Learning module [107] to better adapt to the users value and priorities.

1) Monitoring of Message Queue System and Process (FIG. 1 [101, 102])

The system is initially configured with known queues, respective path(s), and security credentials that are required to access these queues. The system is also given an initial starting date and time value from which messages should be processed and ranked. The system processes messages till a noted end date and time value. If configured for real-time monitoring mode, which only requires an initial date and time, the system continuously monitors and ranks on a real-time basis. The queue is monitored for both new and removed messages.

Figure 2:
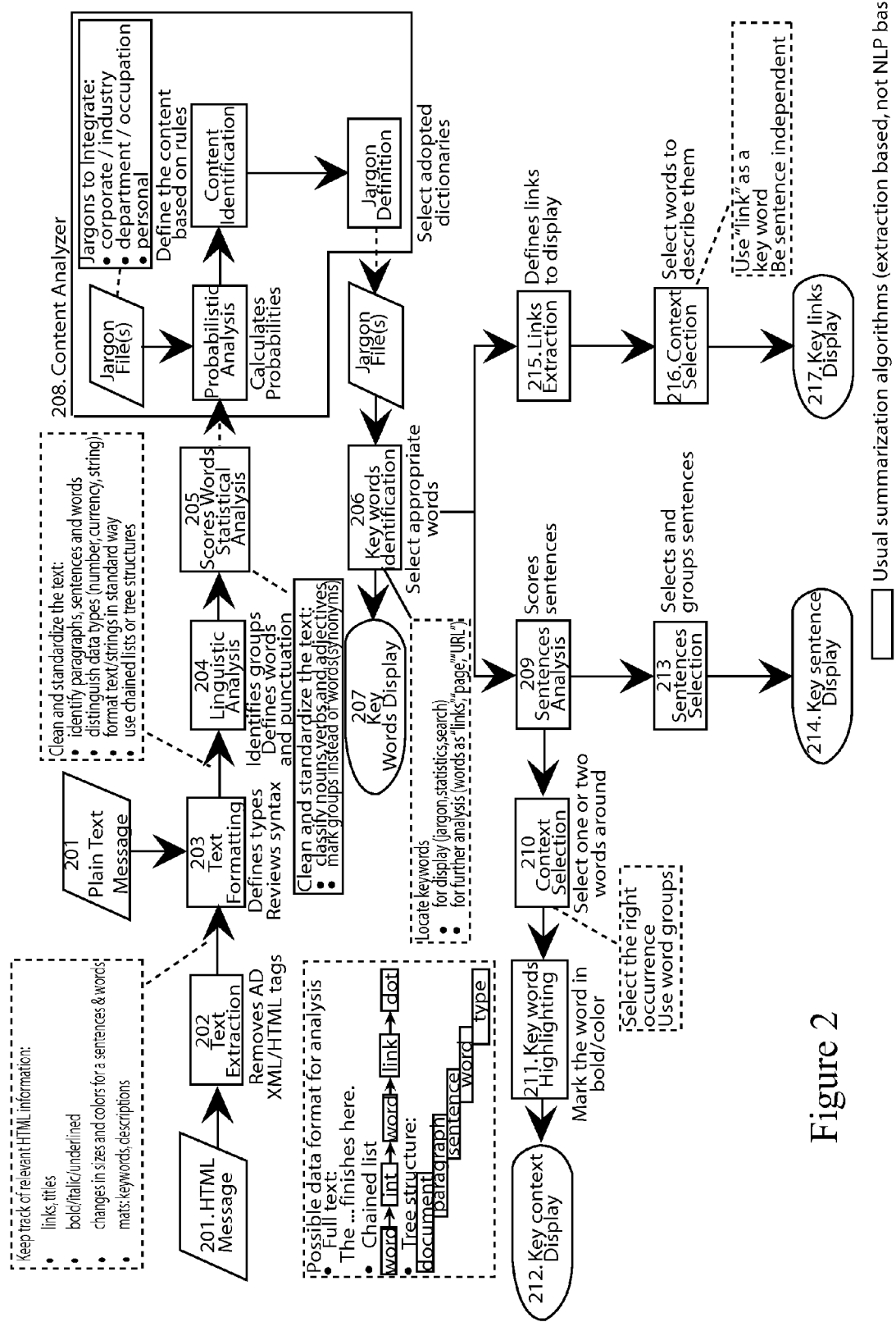
FIG. 2 illustrates a flow diagram for a message parsing process in accordance with an embodiment of the invention.
Figure 3:
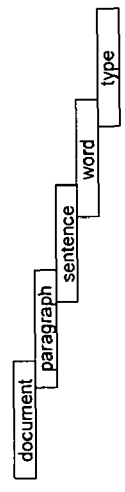
FIG. 3 illustrates a flow diagram for a portion of the process illustrated in FIG. 2.
Figure 3:
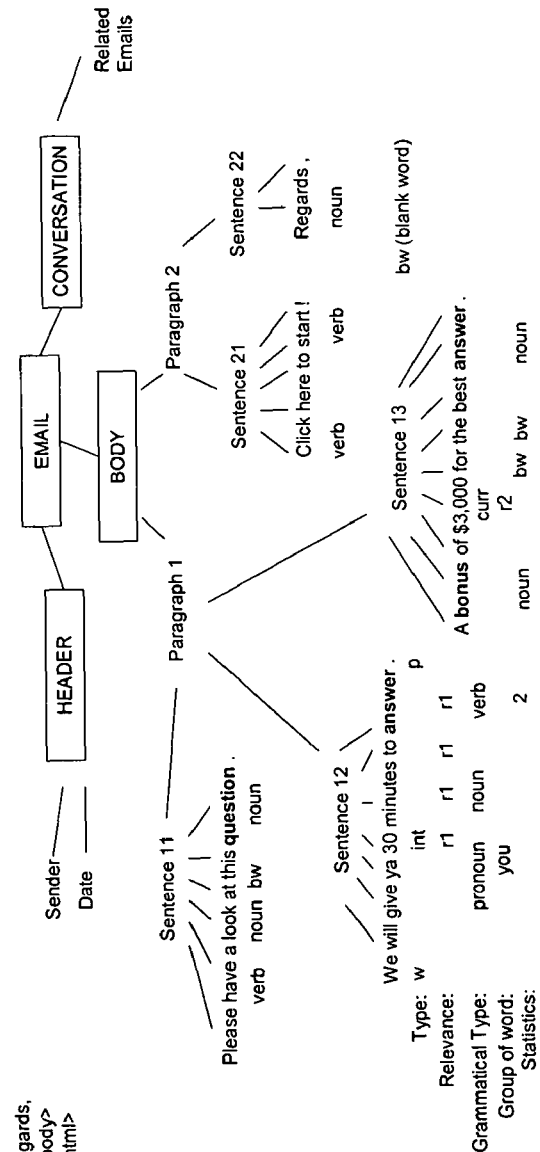

2) Message Parsing System and Process (FIG. 1, FIG. 2, FIG. 3)

Upon retrieving a message from the queue, the message is decomposed into a structured entity (FIG. 1, FIG. 2) and a statistical analysis [205] is performed. This analysis results in numerous data points that are stored into a historical repository [104] and are fed to the Prioritization Engine [105]. Keywords and key sentences along with contextual information are sent as a message summary to the GUI [106]. The analysis also initially classifies type of structured content based on known schemas. If the structure is unknown it attempts to classify it under existing structured schema as a subclass. If it can't be classified, the message and related information are not entered into repository.

Once the scheme has been established, an extraction methodology and system is further employed to data-mine attribute values and their respective quantitative information. The quantitative extraction attributes may include one or more of the following:

a. Security Context: Source, Destination, Intermediate Paths, Sensitivity b. Inherent Metadata: Priority Classification, Category, Conversation Thread c. Time Factors: Sent, Received, Transactional Qualifications, Acknowledgement Furthermore, the extraction method and system will look at the internal unstructured content for further valuable data points. It will conduct both a quantitative and qualitative analysis on this unstructured content.

The result of the extraction process updates a repository of collected values [104]. This repository serves as a data collection to which a prioritization algorithmic method and system is applied [105].

After the decomposition process, summarization process [209, 213, and 214], and keyword identification process [209-212, 215-217] are performed. Keywords and key sentences along with the contextual information are sent as a message summary to the GUI [106].

HTML Message or PLAIN TEXT Message Box (FIG. 2):

These boxes indicate a message arrival. A distinction is made between a message in an HTML format and a message in a Plain Text Format. Message written in HTML Format need specific processing described in the Text Extraction box [202].

Text Extraction Box (FIG. 2):

Whenever a message written in HTML (Hypertext Markup Language) is received, it is stripped of its HTML tag elements. Removal of <script>, <body>, <head>, <html>, and <meta> tags or HTML comments is performed for irrelevant markup.

For relevant mark up tags, data is extracted for further analysis. These relevant tags include those that represent:
    a. Links
    b. Titles
    c. Font styles: bold, italic, underlined
    d. Font colors
    e. Font sizes
    f. Meta tags: keywords, descriptions Text Formatting Box (FIG. 2, FIG. 3):

This box accepts as input, a Plain text Message or a cleaned HTML-like Message. The term HTML-like is used because the text might contain some relevant tags (<b>, <font> . . . ) but is not a valid HTML document per se (i.e., no <html><head> tags). This step of the process splits the whole text in to its components, creates the internal raw representation of a message, identifies paragraphs, sentences and words, and distinguishes the different data types (e.g., numbers, currencies, strings, etc). Both types of message format (HTML and raw text) inputs can have the same output format. An example depicting an HTML sentence as an input and the resulting decomposed output is shown in FIG. 3.

Linguistic Analysis Box (FIG. 2):

In this step, a linguistic analysis is performed on the message. This step identifies the groups of words that are linked together and gathers information about the structure of the message (e.g., punctuation, etc.). Also, type errors, if present, can be processed so that the statistics apply to the real words and not to a misspelled word.

Statistical Analysis Box (FIG. 2):

The statistical analysis box provides the mathematical results that are used to extract the key words, and/or sentences and/or links. Statistics are kept per word and/or kept per group of words. At this point some words can be identified as being blank words (i.e., common words in a language).

Keywords Identification Box (FIG. 2):

Now that the words or group of words are scored, the key words can be identified. Key words depend on different factors:

a. Score of that specific word in user's keywords database (high, medium, low, and spam priorities) and/or
    b. Score of that specific word in the message thread and/or
    c. Score of that specific word in the message itself
    d. Word is part of a jargon (see Content Analyzer section) [208]

Other specific keywords that refer to the text itself are identified. Particularly, keywords that refer to an HTML link (e.g., 'link', 'URL', 'site', etc.) might be used in the prioritization process.

Keywords Display Box (FIG. 2):

This box handles the display of the key words. Key words are represented internally in a specific way. The step is responsible to convert the internal representation of a keyword into a visible and intuitive representation for the user in the GUI. This may be for example to display a keyword in a different color, font or style. Also, in another embodiment, a keyword could be displayed along with some context. This is part of another step called keyword context selection [210-212].

Content Analyzer Section (FIG. 2):

A jargon file contains several jargons/important words depending on the end-user business area or industry (e.g. in insurance industry "policy lapse", in banking industry "accounts termination", in govt. industry "public complaint notice" etc.). A user may have several other jargon files such as personal, departmental, hobbies, sports, etc. A user will be able to create and update his/her jargon files and important industry words/jargons within those files. Pre-defined jargon files (or jargon dictionary) can be provided at a central organization-level or at an individual user's level and can be continuously updated using the data files.

In the Content Analyzer process, a right jargon file is selected as an input for the Keywords identification box, to increase the accuracy of the summary. A probabilistic approach that correlates all jargon files and computed word scores is used to select the right jargon file. Also since a jargon file will also define the type of content that a message has, different rules can be applied to the message depending on the type of jargon files it is related with. This methodology becomes a part of the adaptive learning process [107].

Sentences Analysis Box (FIG. 2):

After the keywords are identified, the most relevant sentences are examined. All the sentences will be scored according to a particular algorithm. The algorithm scores a sentence based on how many keywords are included in the sentence. At the end of this step, every sentence will be attributed a score.

Keyword Context Selection Box (FIG. 2):

The keywords might be rendered as a suite of words. This approach doesn't offer enough valuable information about the context. Therefore, in one embodiment, some context should always be displayed with a keyword. In order to display it, it has first to be selected. Such an embodiment selects the context as simple as the two to three words before and after a keyword or it could be more complicated and include the text structure (e.g., punctuation, etc.) in its decision to take a word as part of the context. As the same keyword may appear many times in the document, data issued from the Sentence Analysis Box will be used to define summary in a more accurate manner.

Keywords Context Display Box (FIG. 2, [212]):

This step of the procedure [212] will render the keywords and their context in the GUI. Keywords may be highlighted or may appear in a different style whereas the context will be displayed as normal text [211].

Sentence Selection Box (FIG. 2):

This step performs the selection of the key sentences. After the sentences are scored, the most relevant ones are selected. This can be as simple as sorting all the sentences by score and selecting those that are at the top of the list (if the list is sorted with the most relevant sentences on top)

Key Sentences Display Box (FIG. 2):

Several key sentences are selected and are internally tagged as being part of the summary. This step transforms this internal representation of the summary in a graphical one. This can be as simple as displaying the sentences and the keywords in the sentences in a different color but could also involve an intelligent organization of the sentences.

Links Extraction Box (FIG. 2):

After the key words are scored, a special "type" of data will need particular attention. This "type" is the link type. Links will often need to be included in the summary. However, a link's name is often not explicit enough to give the user all the information he/she needs about that link (e.g., if the link is displayed in its IP address form, no intuitive information is provided). A link requires additional processing of its tag to see if the text included in the <a> tags is explicit enough or contains any keywords that might need to be displayed.

Link Context Selection and Display (FIG. 2, [217]):

The context selection around a link can be as simple as parsing the text in the <a> tags or as complicated as searching for a word such as "link", "site", "URL" that refers to that link, then gathering information from that part of the text. Those words, if they exist, will be displayed as key words [217].

3) Prioritization Module (FIG. 1, FIG. 4-18)

3.1) Prioritization System (FIG. 1):

The prioritization module comprises of: Parsed Statistics Repository [104], Prioritization Engine [105], and a portion of Adaptive Learning [107].

When a new message arrives in a queue, the message parsing process starts to purify and structure its content and stores its metadata into a database [104]. The metadata is used as parameters to each of the independent filters which evaluate the overall priority of a message.

The prioritization engine [105] includes two distinct components: a list of the messages [406] and a processor unit [407]. The list of messages contains the messages ordered by overall priority and is updated whenever a new message arrives, a message is deleted or some event occurs. The processor unit contains and manages the different filters [403], taking the parsed statistics message [401] as input and computing the priority value as an output [404].

Once the priority value of a certain email is calculated, the message is inserted in the list [406] and updates are performed on the statistics to be used for further analysis [107].

Figure 4:
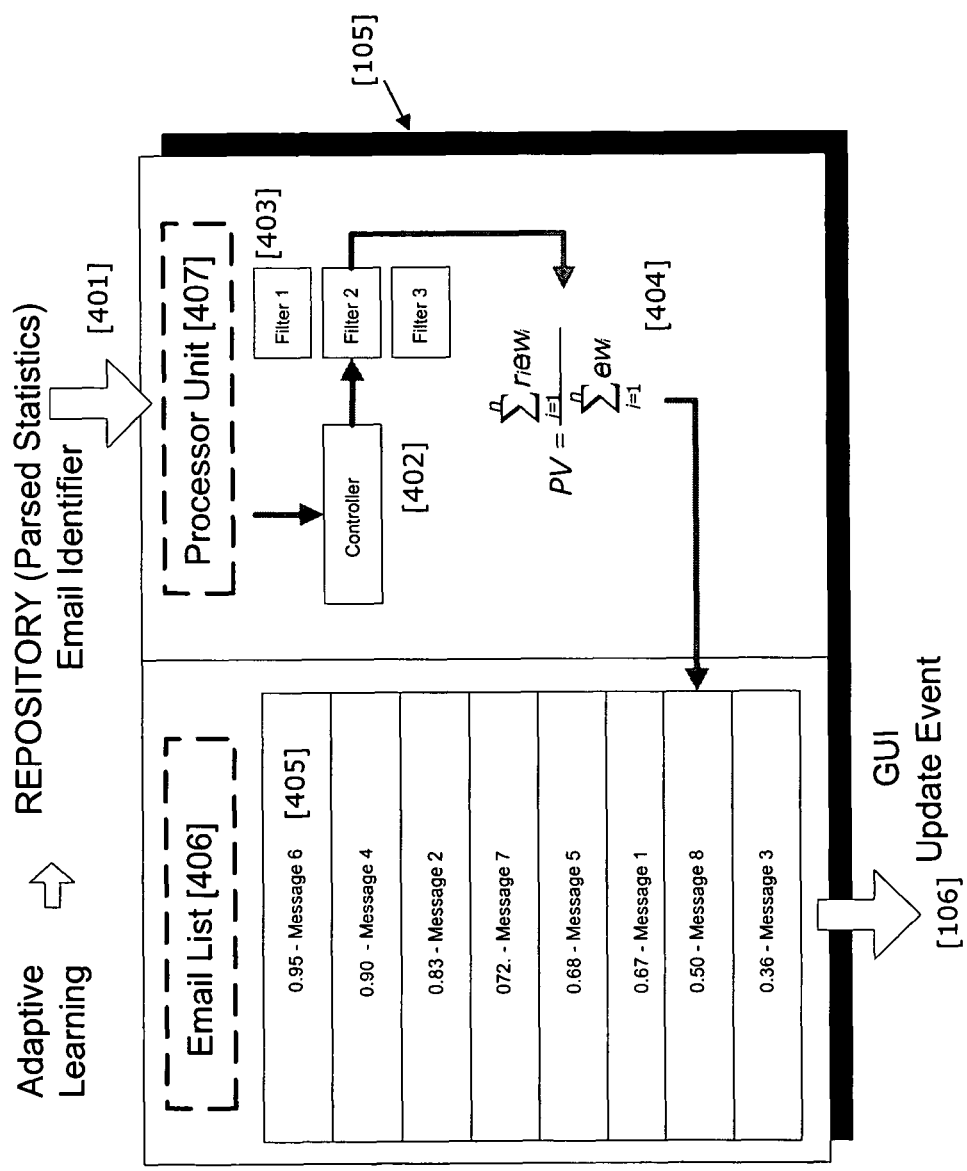
FIG. 4 illustrates the interaction of portions of a prioritization system in accordance with an embodiment of the invention.

3.2) Prioritization Process (FIG. 4)

The prioritization process takes place after a message has decoupled from its source and a decomposition of its parts and attributes has been made [103]. An email message represented by a unique identifier [401] is given as an input to the prioritization engine. This input comprises of various statistics from the repository [104] where the message has been stored and structured. Statistics retrieved by the controller [402] are then input to a set of independent filters [403] that will compute priority values based on different aspects of the message. The filters return different values that the system compute through a function (FIG. 4, FIG. 6), calculating a single value as a result (using a weighted average in the current implementation). This result is the overall priority for the message which can then be classified in the messages list [5]. Once the process of prioritization finishes, the prioritization engine sends an update event [6] to the system in order to refresh the GUI [106] or execute any other related action.

Figure 5:
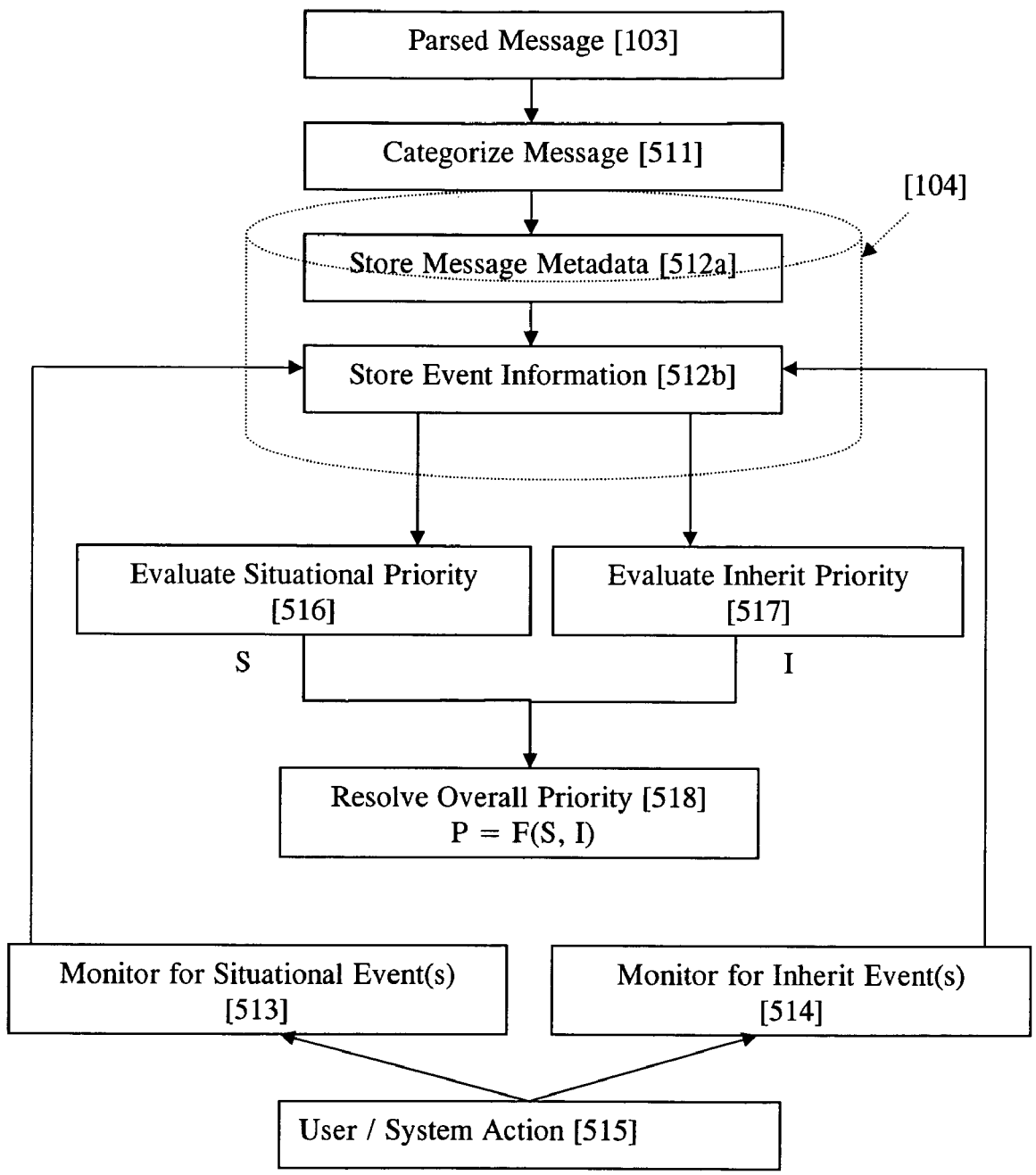
FIG. 5 illustrates a flow diagram for a prioritization algorithm in accordance with an embodiment of the invention.

3.3) Prioritization Algorithm (FIG. 5)

The initial step of prioritization evaluation begins with a broad categorization of the message [511]. The message is categorized into alerts, business, confirmation, published information (for example: newsletter), meeting or task request/acceptance, personal and unwanted solicitation. Categorization relies on contextual analysis of the message via keyword mapping, message format, layout, and schema. The Security Context (Source, Destination, Intermediate Paths, and Sensitivity), Inherent Metadata (Priority Classification, Category, and Conversation Thread) and Time Factors (Sent, Received, Transactional Qualifications, and Acknowledgement) data points are stored in a data repository [512a] for an indefinite period. This stored data is then evaluated for its situational priority value [516] and inherent priority value [517]. The combination of the evaluation reveals its overall priority which can be fed to any destination client that wishes to know the value.

The evaluation process, however, is not a one time event. The priority of a message will be evaluated over time. The system will listen for events; these events are caused by either user or system actions [515]. The situational [513] and/or inherent [514] events will be monitored and given an event occurrence the event attributes will be cataloged and stored [512b]. This will then further engage the system in re-evaluation of existing message priorities [516, 517], and dynamically update the overall priority [518].

Illustrative examples of Inherent events are:

a) The addition of an important keyword to the system by the message recipient; messages containing the keyword will have a higher priority.

b) The message recipient has never updated a default filter of corporate policies, but he/she is continuously updating other filters. The weight of the filter which has not been updated will be reduced to increase the accuracy of the other filters.

Examples of Situational events are:

a) A meeting time is approaching; messages regarding this meeting have their priority increased.

b) The list has not been updated for a long time; the system refreshes the list and reduces the priority given to old emails 3.4) Conceptual Embodiments of Message Prioritization 3.4.1) Situational/Inherent Prioritization Model Situational priority [516] is the interest given to a message within a specific context is related to a single message and varies with the time (a message regarding a meeting is important before the meeting but has much less interest once the date is passed). Since recipient knowledge, beliefs, motivations, etc can impact the priority of a message the more we know about a recipient and the moment the message is being reviewed, the better we are able to assess message situational priority. The more we know about the task or work situation surrounding sending of a message, the better we will be able to assess situational priority.

Inherent priority [517] is the interest given to a message in comparison to the other messages and is based on the content (a casual message from a coworker leaving for lunch is always less important than a message from a new client regarding a purchase order). The more we know about value added attributes of a message such as what is the source and what is destination, topical matter, gist, etc. the better we are able to asses the Inherent priority.

The ability to add or modify dimensions adaptively that pertains to either situation and/or inherent attributes in turn enhances the ability to asses the overall priority.

The overall priority of a message can be modeled by a "Situational/Inherent" priority architecture. Any electronic message (voice mail, email, alert notification, meeting request, corporate publishing, confirmation notice, unwanted solicitation, etc) can be considered to have both a Situational and Inherent priority to its recipient. The overall priority is a function combining Situational and Inherent priorities to provide a single value.

Message priority=function (Situational, Inherent)

The Situational priority has dimensions that are mostly dynamically determined and dependent upon an event or series of events. These events are traced and mapped to bring forth a multi-dimensional function that equates to the situational priority of the message.

The Inherent priority has dimensions that are mostly statically determined and dependent on the information context. These informational dimensions can include one or more of the subject matter, sender(s), recipient(s), message content, embedded messages, and other embedded informational characteristics.

Thus, it can be stated Situational and Inherent priorities are multidimensional equations that when coupled together reveal the overall priority of a message.

Message priority=function [Situational $f$(event dimensions), Inherent $f$(content dimensions)]

This usage coincides with our everyday intuition about message priority. Messages whether electronic, textual, or verbal include situation and inherent facets. A message that relays to recipient that 'the wedding ceremony begins promptly at noon' has event dimensions as well as content dimensions. The event dimension for this example is that the message arrived, and when the actions in the message will take place. If the event will occur in the future it will most likely have a higher Situational Priority. If the event has occurred in the past then it will most likely have a lower Situational Priority. One of the Inherent dimensions of this message is who the sender is. If the sender of this message is known and appreciated by the recipient then the Inherent Priority will be high. Thus the function combining Situational and Inherent will equate to the actual message priority more accurately than a static evaluation of the message.

3.4.2) Relevance/Importance Prioritization Model

The dimensions for evaluating priority of a message can be further decomposed into Relevance and Importance measurements. Relevance is related to the variability that exists on a dimension or filter, whereas Importance is related to the co-variability that exists between two dimensions or filters.

Dimension Value (event or content)=function (Relevance, Importance)

Dimensional Aspect Modeled by Intuitive Aspect Mathematical Representation

Relevance Variability The more unusual or uncommon (relative to some context) a message, the more relevant it is Variance or standard deviation (though usually rescaled)

Importance Co-Variability The more similar a message is to some yardstick, the more important it is Weight parameter Illustrative examples of certain embodiments affecting Relevance are:

a) Whether information is missing or unknown (either within the message body or message header)

b) The amount of knowledge a message recipient has about the incoming message c) Recent message situation context (e.g., "Do I always get messages of this type?" "Do I always get messages of this priority (as given by the sender)"? "Is this message one in a series or a stand-alone"?)

Illustrative examples of certain embodiments affecting Importance are:

a) Similarity between keywords and words in the message, or between keywords and words in the message Title or Subject line b) Similarity between topics in the message and issues of previous messages c) Inherent (i.e., static) salience of context surrounding the message (like sender information)

We can summarize the above portion as follows:

Message priority=function (Situational, Inherent)

Message priority=function [Situational $f$(event dimensions), Inherent $f$(content dimensions)]

Situational $f$(event dimensions)=function (Relevance, Importance)

Inherent $f$(content dimensions)=function (Relevance, Importance)

Therefore:

Message priority=function [Situational $f$(event dimensions $f$(Relevance, Importance)), Inherent $f$(content dimensions(Relevance, Importance))]

3.5) Implementation of Prioritization System (FIG. 601, 602,603)

A filter can be attached to each of the dimensions measured to define the value of both Situational [516] and Inherent [517] priority. These filters aim to analyze their respective dimension and return a value. The Overall Priority [518] is computed based on these values.

In one embodiment the priority can be computed based on the result of multiple, independent and adaptive filters. "Independent" means that new compatible filters, analyzing other parts or attributes of the message, can be dynamically added or removed from the system without affecting the system in any way. "Adaptive" means that these different filters are able to automatically modify their behavior based on the user's preferences, the user's general behavior and the results from other filters.

Filters can include one or more of three factors Weight, Result, and Efficiency. W is an importance weight given to the filter by the system, R is the Result of the application of the filter to a message, and E is the Efficiency of that filter. In one embodiment, a weighted average of these factors is then taken using (W×E as a weight).

The terms Weight, Result, and Efficiency are further described as follows:

Weight is the long term effectiveness of the filter in priority analysis. The weight adaptively changes. It is based on supervised learning from the message recipient as well as historically collected data regarding the effectiveness of this filter in minimizing the deviance between expected priority and actual priority. The historically collected data is analyzed statistically and from an Artificial Intelligence vantage point to reassess the weight value (unsupervised learning). The weight is common to a set of messages.

Result is the actual score given to each message by the dimension analysis and is specific to the message. Result is the concrete expression of the priority computed for this dimension. RESULT answers the question "how important is the email?" based on the filter findings.

Efficiency value expresses uncertainty regarding the Result. The more the result is judged as accurate, the higher is the efficiency. Efficiency is calculated based on the inputs given to the filter and can then be affected by rules across the different filters, based on the contextual analysis. Situation will impact the applicability/efficiency of a filter. Efficiency is specific to the message processed. EFFICIENCY answers the question "how accurate is my result?" given the input parameters. If the filter is not able to answer this question accurately, its efficiency is reduced and the system will favor the other filters.

Filter Values (Weight, Result, Efficiency)=$f$(Message)

Situational $f$(event dimensions)=$f$(Weight, Result, Efficiency)

Inherent $f$(content dimensions)=$f$(Weight, Result, Efficiency)

This model is simply a specialized version of the more general Relevance/Importance prioritization model; where the combination of W and R is giving the Importance (independent from the context) while the efficiency will model the Relevance (taking care of the context).

Importance=$f$(Weight, Result)

Relevance=$f$(Efficiency)

Figure 6:
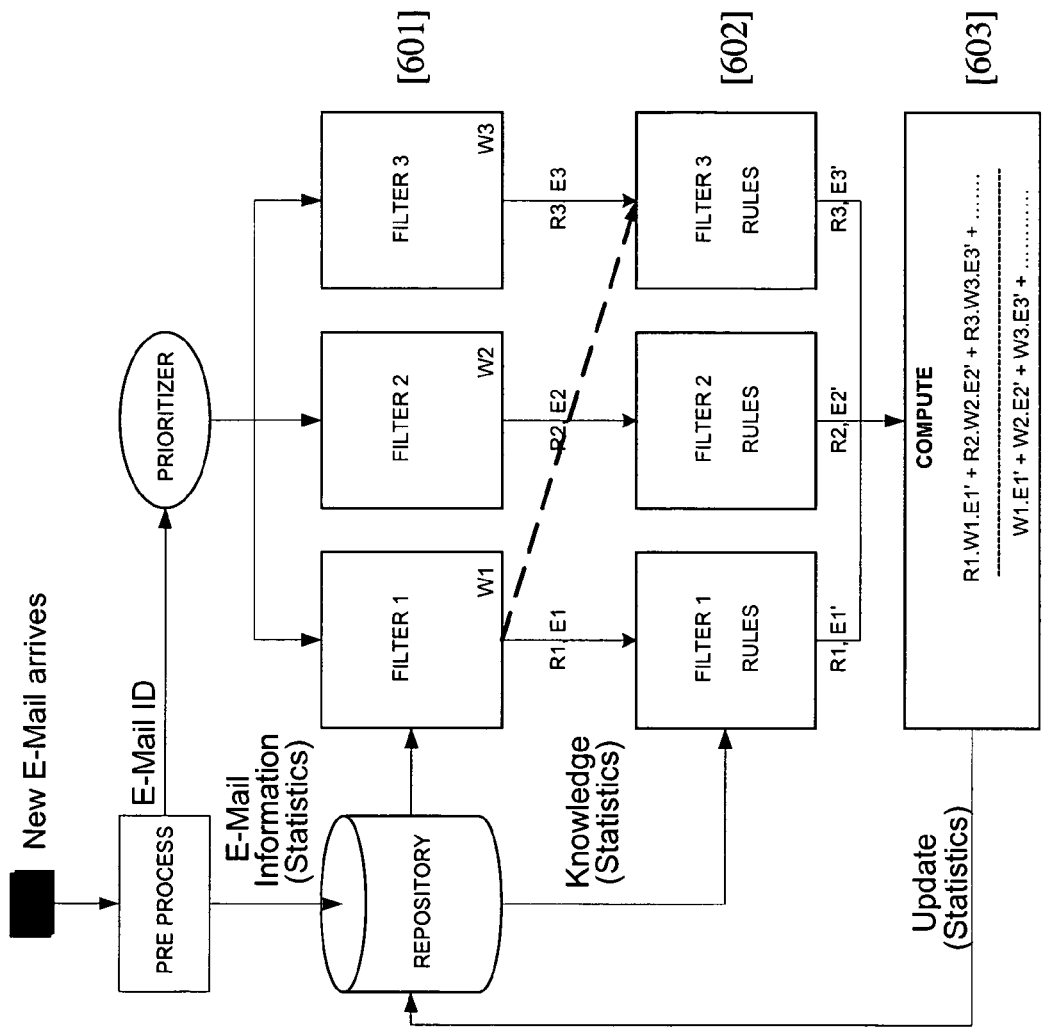
FIG. 6 illustrates a process of calculating Situational and Inherent priority in accordance with an embodiment of the invention.
Figure 7:
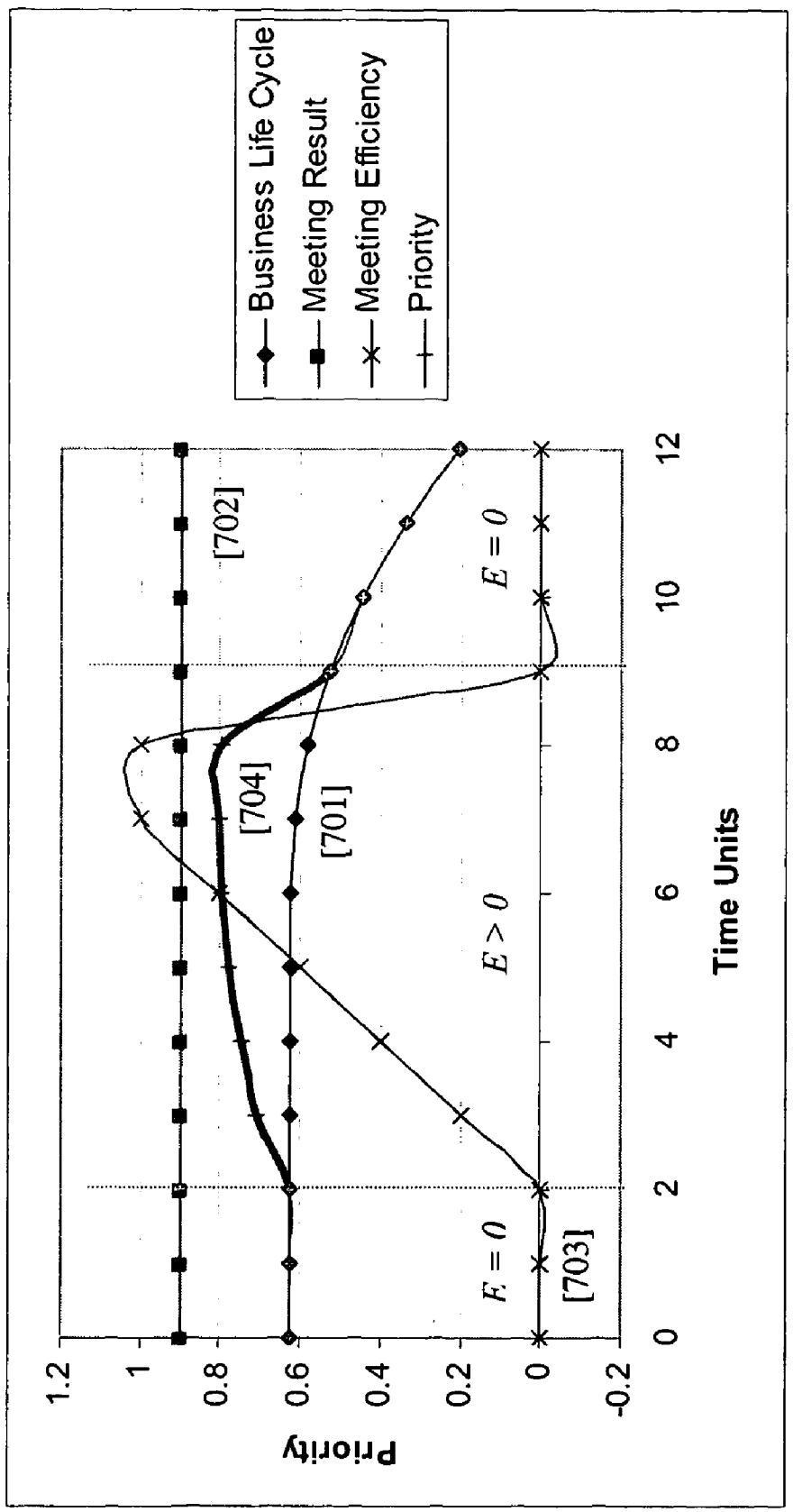
FIG. 7 is a graphical representation of representative results from the Situational calculation illustrated in FIG. 6.

In one embodiment, filter analysis is performed in the three steps shown in the FIG. 6. This is a representation of the implementation methodology to calculate the Situation Priority [516] and Inherent Priority [517] (Filters involved in this process are respectively referred to as Situational Filters and Inherent Filters).

Data Extraction [601]: Each of the filters called by the processor will look at the information within and surrounding an email, to analyze a particular dimension. Filters will return two values: Result and Efficiency.

Rules Application [602]: if two filters are linked and if the result of one filter affects the result of the other filter, rules are applied to modify the Efficiency of the filters.

Priority Computing [603]: results of each filter are computed to obtain the final priority value. The calculation involves the Result, the Efficiency as well as the Weight given for the filters. The priority value returned by the calculation is a decimal value between 0 and 1 which could be displayed as a ranking score to the user.

The interpretation of the Relevance/Importance prioritization model differs slightly when calculating Situational and Inherent prioritization scores as described below. Interpretations of Weight, Result and Efficiency parameters for both Situational and Inherent priorities are detailed below:

3.5.1) Situational Evaluation [516]:

The messages arrive in a queue with context indicators and a priority given by the sender. These indicators are based on the sender's knowledge, perspective of the known value in the underlying event details, and contextual details. Simply stated the priority of the message is from the sender's perspective.

Some senders may not indicate a relevant priority value and so it can be assumed to have some default priority. The assumed priority has been typically modeled along the lines of 'Last In First Out' discipline. Furthermore, the context of the message can vary greatly; however, at a minimum a set of the context is decipherable. This set will be along the lines of sender(s), recipient(s), and intermediate paths. Further, it is most likely the message will also have some sort of topical indicator or subject description.

The failure in using these elementary sets is that an initial priority can be gathered, however, a situational priority will be difficult to predict without further qualitative analysis. The question that will be raised is, 'What is the priority of message 1 with respect to message 2 with similar context?' To answer this question simplified time dependent priority disciplines are used. These disciplines are LIFO (Last In First Out) and FIFO (First In First Out).

Figure 10:
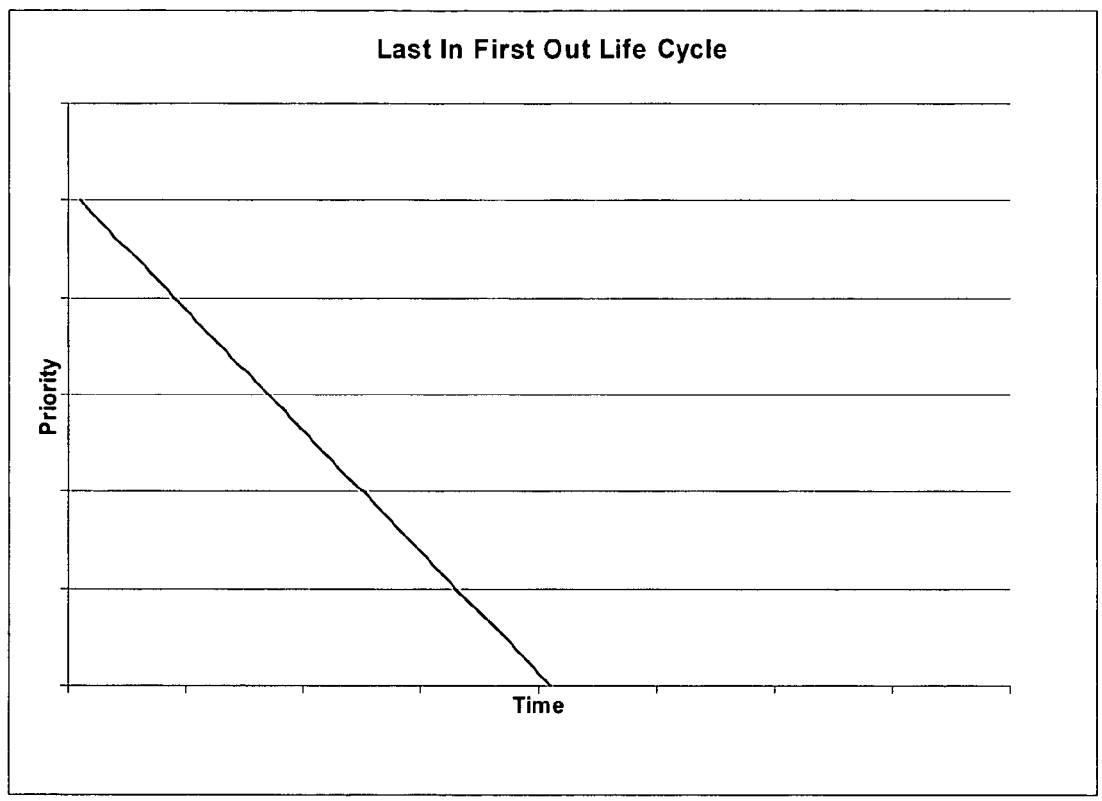
FIGS. 10-18 are graphical representations of Lifecycle Priority-Time curves for various categories of messages in accordance with an embodiment of the invention.

Using a qualitative analysis in which the claimed priority coupled with the context is categorized will result in varying initial situational dependent priority paths. Assuming a steady flow of queued messages, an individual message's graphical representation is illustrated in FIGS. 10-15, which depict Lifecycle Priority-Time curves for various categories of messages The following are the time curves (or Life Cycles) identified for different type of messages:

LIFO (Last In First Out)—FIG. 10

The effect on priority is that if it's not processed before the next message is queued, the current will lose priority to newly arrived message.

Figure 11:
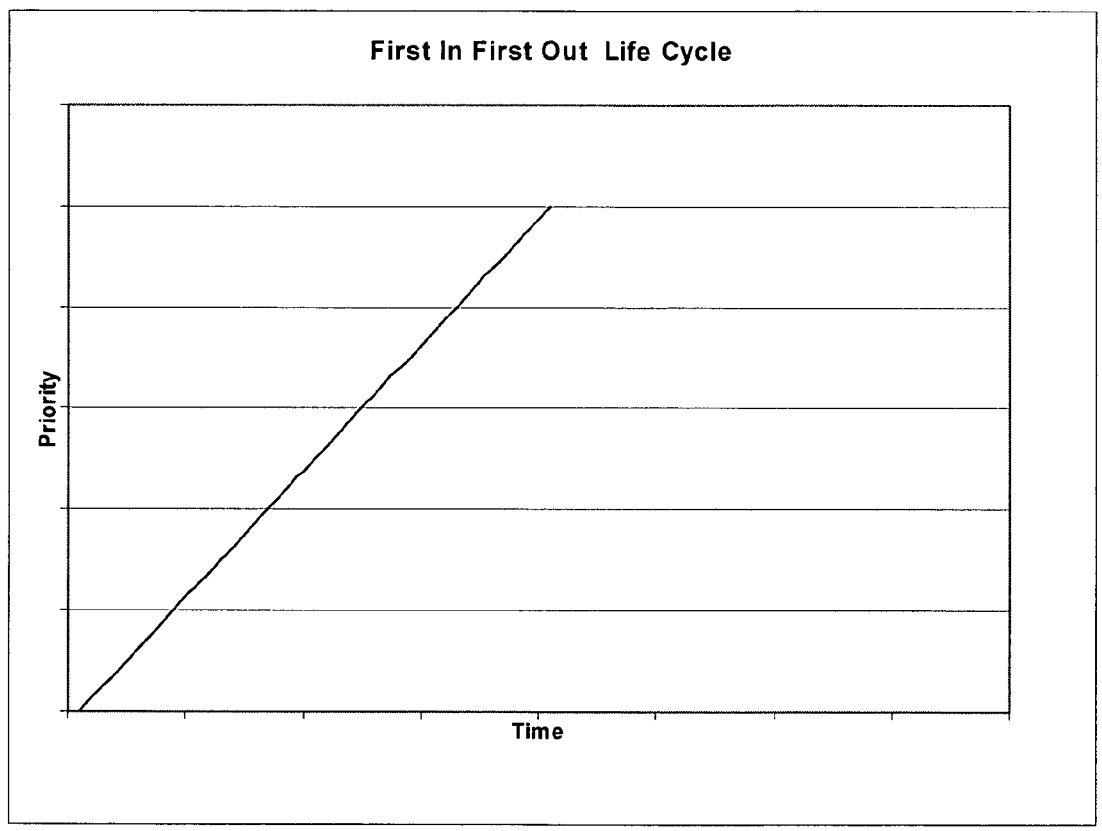

FIFO (First In First Out)—FIG. 11

The effect on priority is that if it's not on top of the queue it will gain priority as older messages are processed. All new arrivals will be of lower priority.

Figure 12:
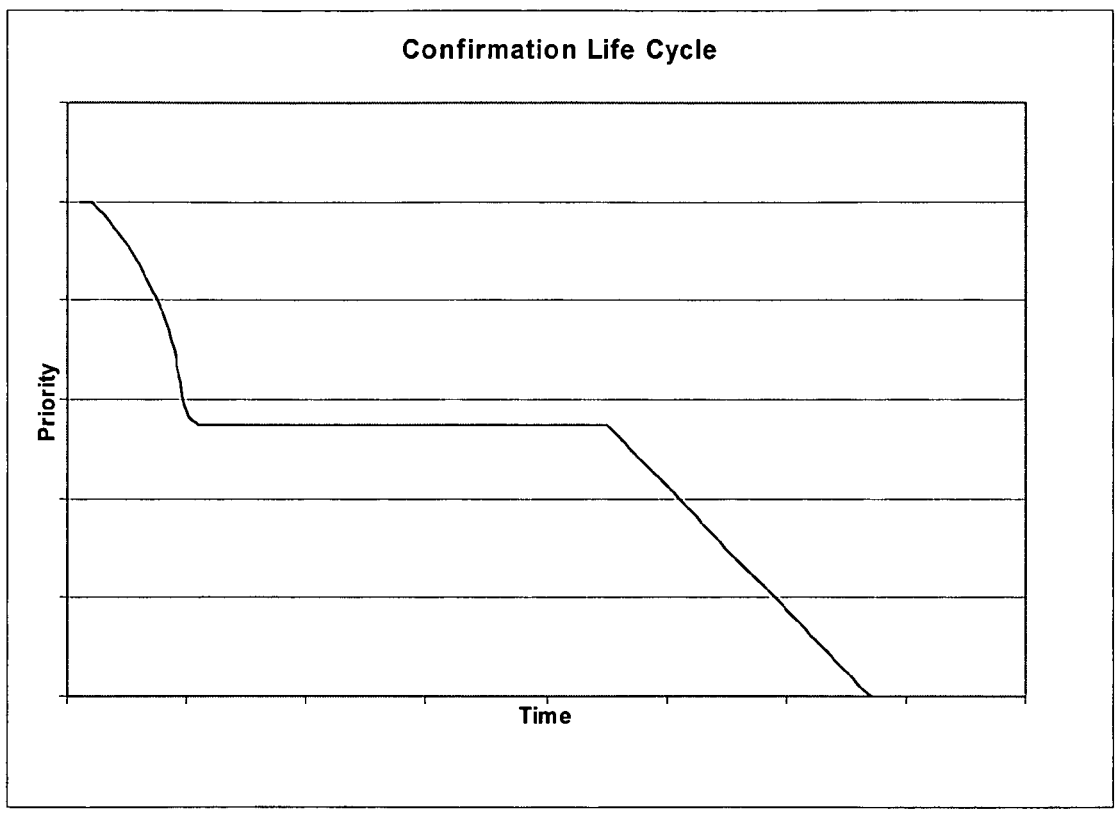

Confirmation—FIG. 12

The priority will be relatively high for a short period of time, after which the usefulness of processing the message will be steady and then finally decreasing. An example would be shipping confirmation. A recipient would initially value the confirmation message. The value would then decrease slowly for a moment, before falling down once the shipment arrives.

Figure 13:
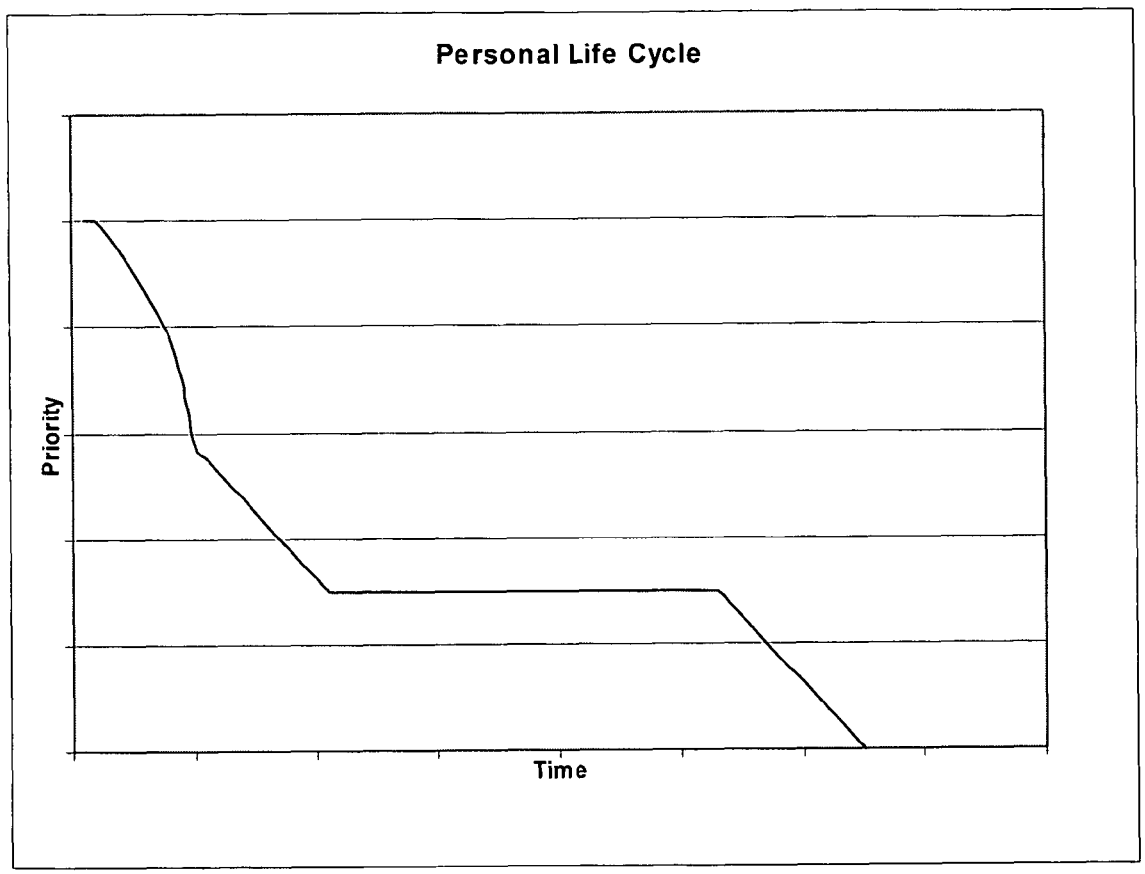

Personal—FIG. 13

The priority will be relatively high for a period of time, after which the usefulness of processing the message will be less as other business messages will most likely have greater priority, thus significantly lowering the value of the initial personal message.

Figure 14:
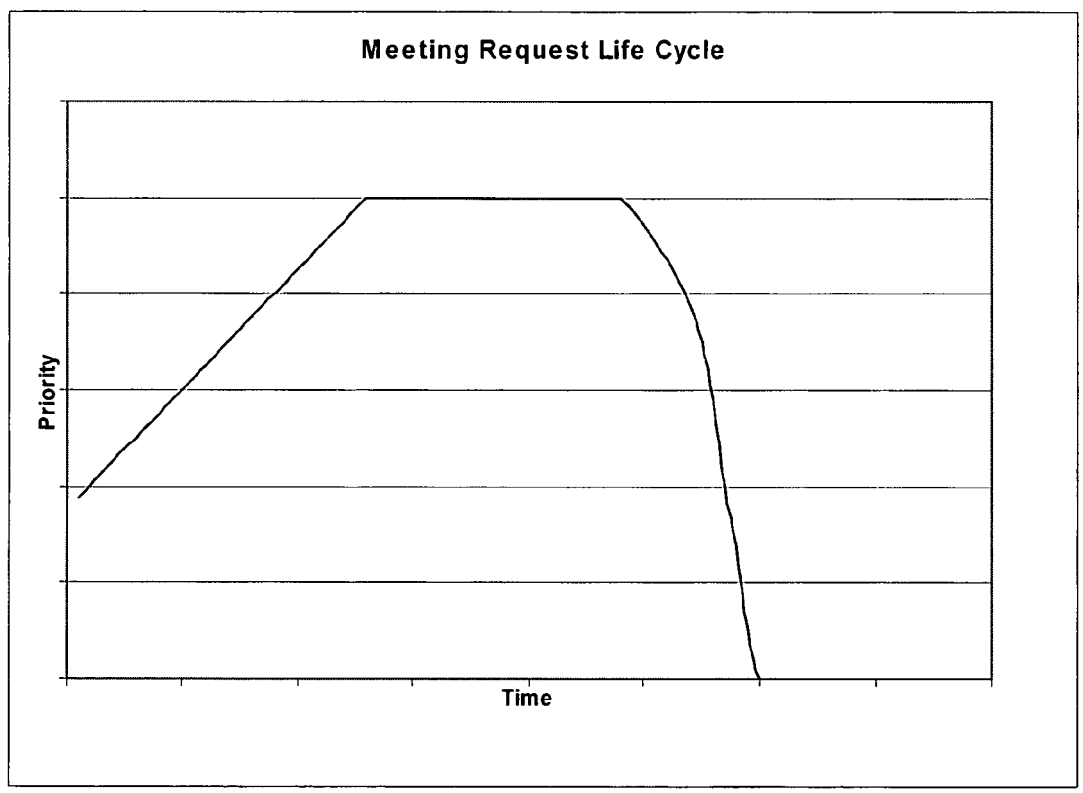

Meeting Request—FIG. 14

The priority will be increasing till the time of meeting at which the priority would remain high and leveled. However, after the meeting the value would quickly decrease.

Figure 15:
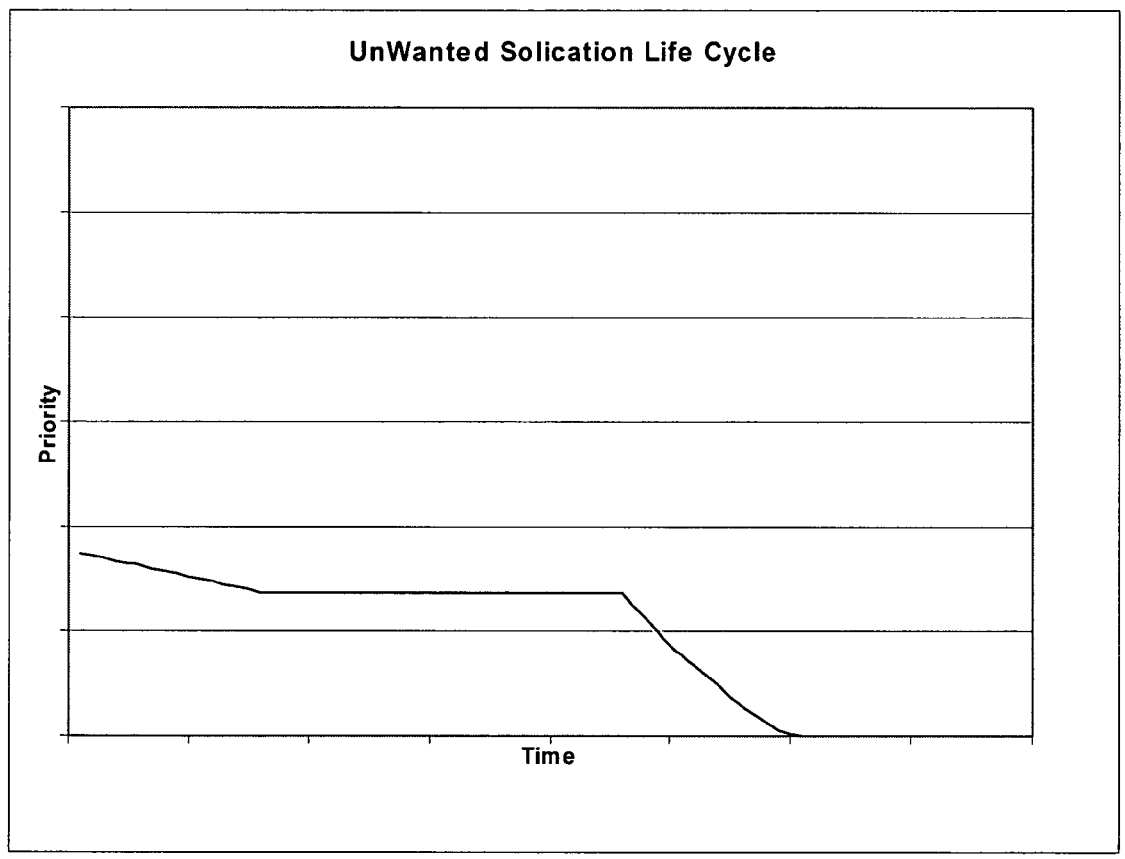

Unwanted Solicitation—FIG. 15

The priority will be relatively low for a short period of time, after which the usefulness of processing the message will be steady but of limited priority and most likely not of any value. Thus compared to other messages in the system the priority would decrease.

Figure 16:
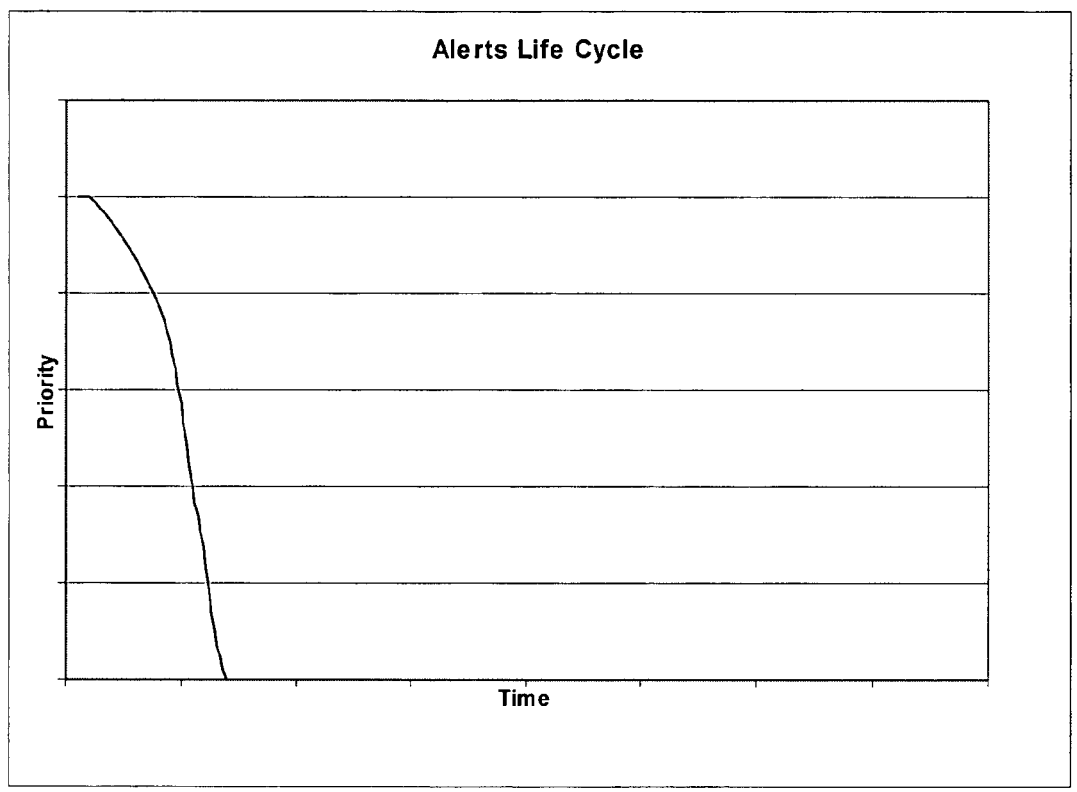

Alerts—FIG. 16

The priority will be relatively high for a short period of time, after which the usefulness of processing the message will have gone down due to window of opportunity closing. An example may be critical news on a stock, which would have investors taking immediate action.

Figure 17:
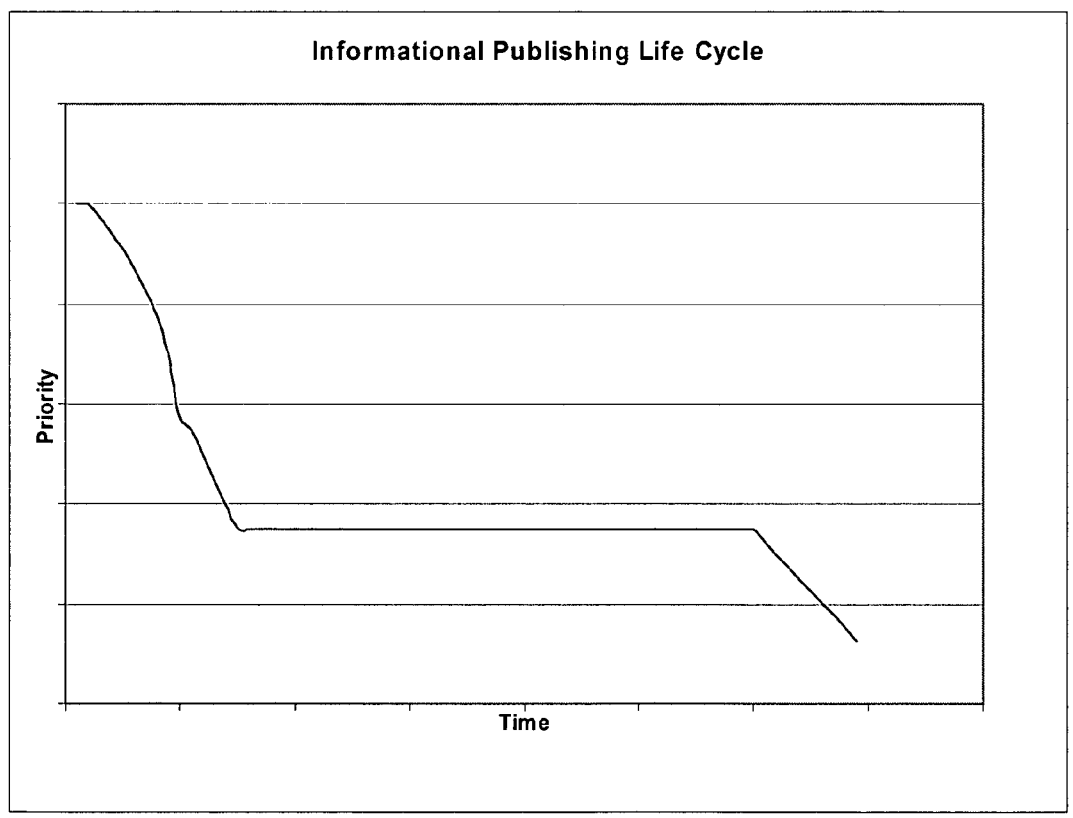

Published Information—FIG. 17

The priority will be relatively high for a short period of time, after which the usefulness of processing the message will be steady but of limited immediate priority and then finally decreasing. An example would be a monthly newsletter. A recipient would initially value the news letter for some initial content. However, once read, the usefulness would be limited.

Figure 18:
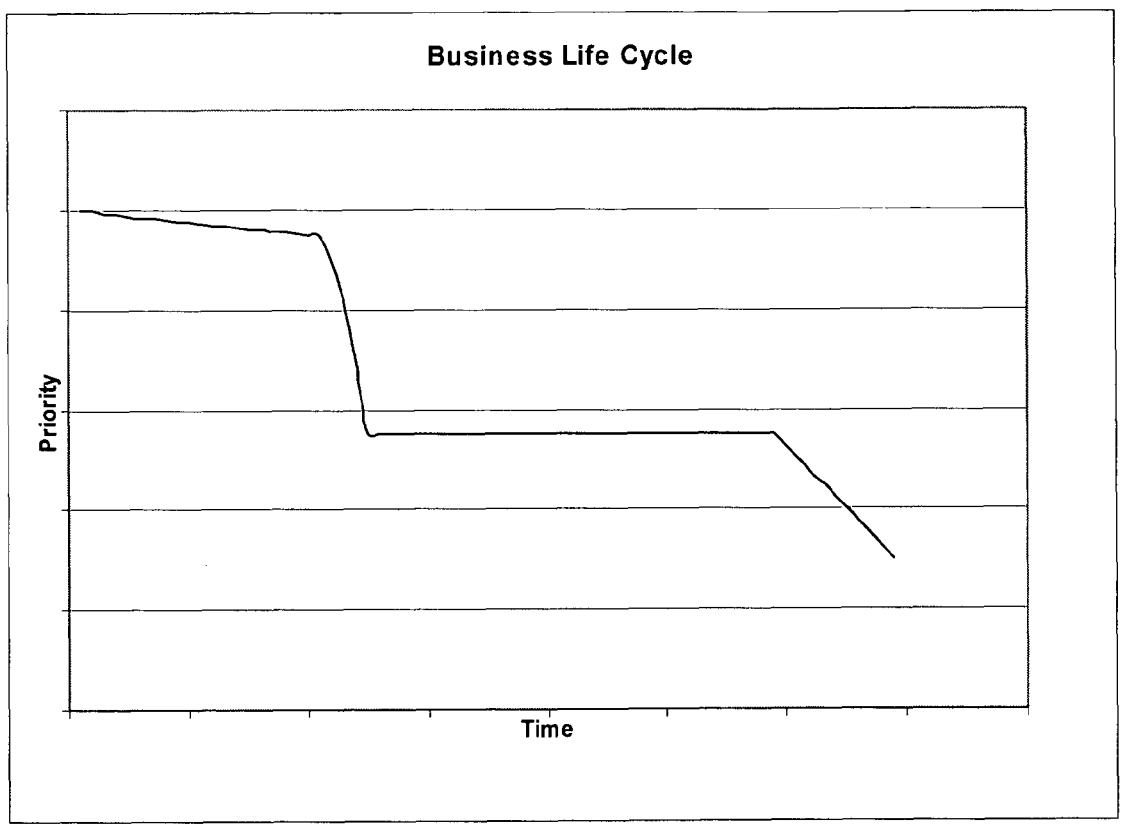

Business—FIG. 18

The priority will be relatively high for a period of time, after which the usefulness of processing the message will be less as other business messages will most likely have additional information or significantly lower the value of the initial business message.

This initial situational dependent priority path is the baseline priority the message will take assuming some initial analysis. Given new events and event analysis the effects will be reflected in situational priority.

The Situational application of Relevance/Importance includes a combination of the previous time curves which will define the overall life cycle of the email. Each of the curves has a specific shape and meaning (FIGS. 10-18). At the same time all messages have a continuously decreasing interest as the user wants to be up to date. Situational priority is calculated by a set of mathematical equations (time curves), software "modes" (incoming meeting, lunch break) and additional events influencing the result.

The situational factor is continuously reevaluated in the application and a situational message re-qualification can be started by a time event (timer) or a user event (lunch break, waiting for an email from this person, follow up . . . ), known as Situational Events.

Situational Filters will be responding to a Situational Event by computing a new value for the situational priority. Situational Filters are also time dependent and implement the notion of time curves discussed previously.

For each of the Situational filters, the implementation can be achieved as follows:

Result is the expression of an equation and is time dependent: $R=f(t)$. Depending on the type of curve implemented in the filter, this could be a polynomial, logarithmic or discontinuous equation, presenting a relative priority of the email through time.

Weight is the importance given to a curve or a type of curve (life cycle, event . . . ) in comparison to the others.

Efficiency is the validity of the filter at a time and is expressed by a constant C representing the certitude of the model (how much the time curve selected applies to the current email) and a function $g(t)$ defining when the filter should be applied. $E=g(t) \times C$ To illustrate the above implementation, an example is shown in FIG. 10. In this example, a time curve is given for the life cycle of the message [719], this can be for instance the standard curve for all the business messages. This time curve is the Result of the lifecycle filter and the Efficiency is set to 1 all the time (which does not affect the curve).

The message contains information about an important meeting; the meeting importance is given by the curve Meeting Result [702] and is constant. However in the current context, the meeting will be important around a specific time (6 pm-8 pm on the X-axis). The Efficiency [703] is varying accordingly, giving more importance to the filter when the time comes. A curve not represented here combines the Meeting Result and the Meeting Efficiency to obtain the overall life cycle of the meeting.

Priority [704] is the result of the filter combinations, (business and meeting lifecycle), expressing the situational priority of this email through time.

3.5.2) Inherent Evaluation [517]

Figure 9:
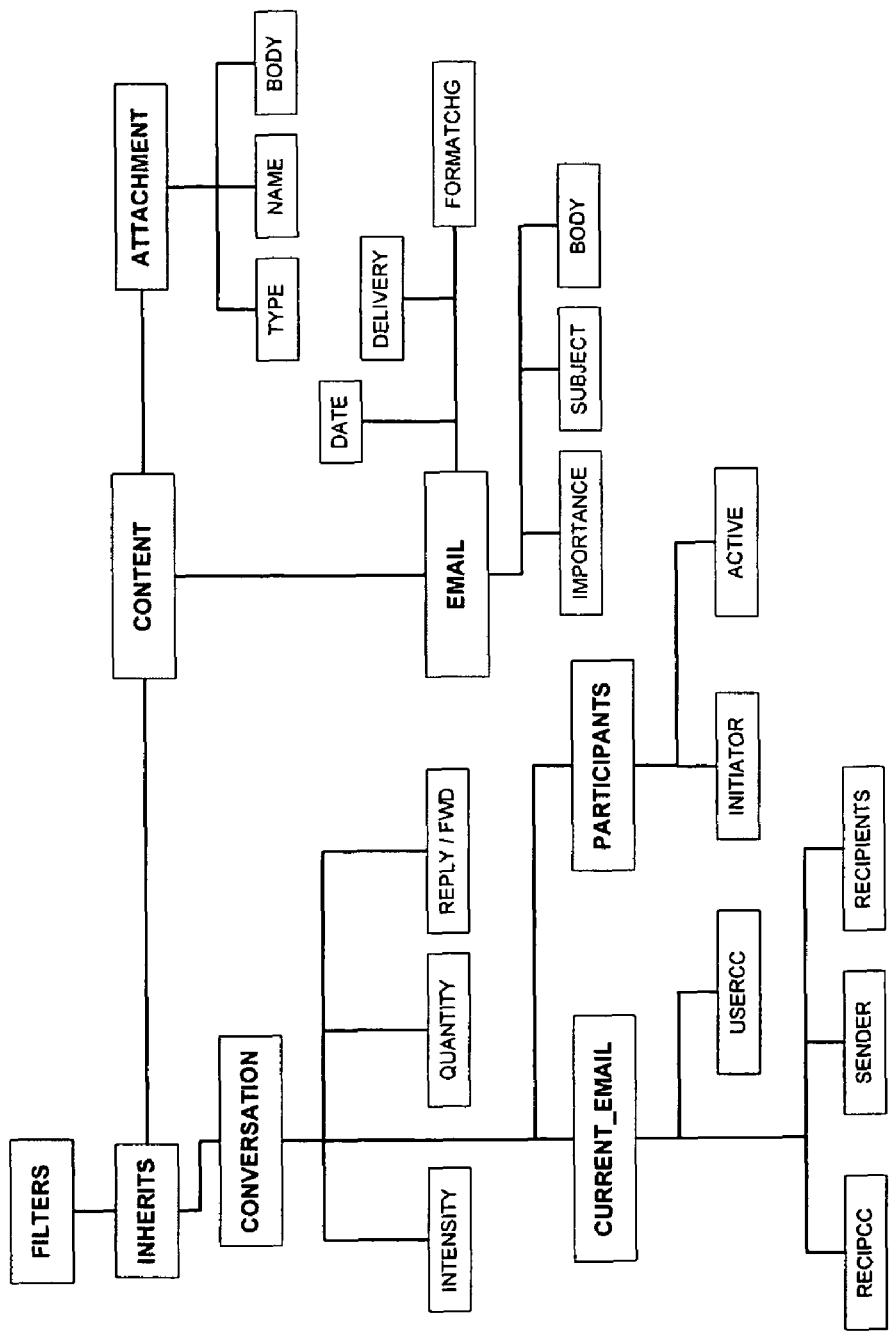
FIG. 9 illustrates a hierarchy of an Inherent filter in accordance with an embodiment of the invention.

The inherent evaluation is based on rigorous content analysis of the message. The analysis of the message is mapped to a set of filters. These filters independently address the value associated for a particular data element in the message. The filter may apply quantitative analysis such as the number of senders that were intended to receive the message, or the number of intermediate paths the message encountered before being directed to the recipient. The type of qualitative analysis it will conduct is the level of value each intermediate path brought to the message context or the importance level in priority ranking for the recipients. In one embodiment a hierarchy of Inherent filters work together to analyzing different aspects of the message (FIG. 9).

Identification of the entities involved: the system is looking at the existence of the contacts in the user's profile database to see if a special rank of importance is associated (high, medium, low or spam). More priority is given to the sender with the highest rank. Priority will also be influenced by the additional recipients of the message.

Identification of the message content: the system is looking for specific keywords in the subject, the body and embedded messages. More keywords in a message increase the probability to accurately identify the content, the type of keyword (dictionary) being selected to arrive at the relevance of the message (priority).

Message attributes: the system is looking for the information given by the existing attributes of the message. This includes the Reply or Forward status, the importance attribute, the delivery receipt, the date the message was sent.

Multiple other criteria: the system is analyzing other interesting information like changes in the format (bold/color sentences), the type of message, the existence of a signature.

Inherent factors are computed once, when the message arrives. Messages can be reevaluated by a system event (software update) or a user event (priority rule added), known as Inherent Events.

As for the Situational part, Inherent Filters will be responding to Inherent Events by computing a new value for the situational priority based on the three factors Result, Efficiency and Weight, implemented as follows:

Result is the calculation of the importance of the message based on a series of static rules, defining how important the message is in the dimension analyzed. The calculation is mainly based on the messages attributes and content along with personal and organizational rules and policies (as the corporate hierarchy for instance).

Weight is the importance given to one dimension in comparison to another. The identification of the message sender is more important than the date email is sent.

Efficiency is the estimated accuracy and validity of the result based on the inputs available in the dimensions. Efficiency is affected by:

A lack of information in the dimension during the analysis

A logic interaction between different filters affecting the priority

Unusual results in comparison to historical data

Figure 8:
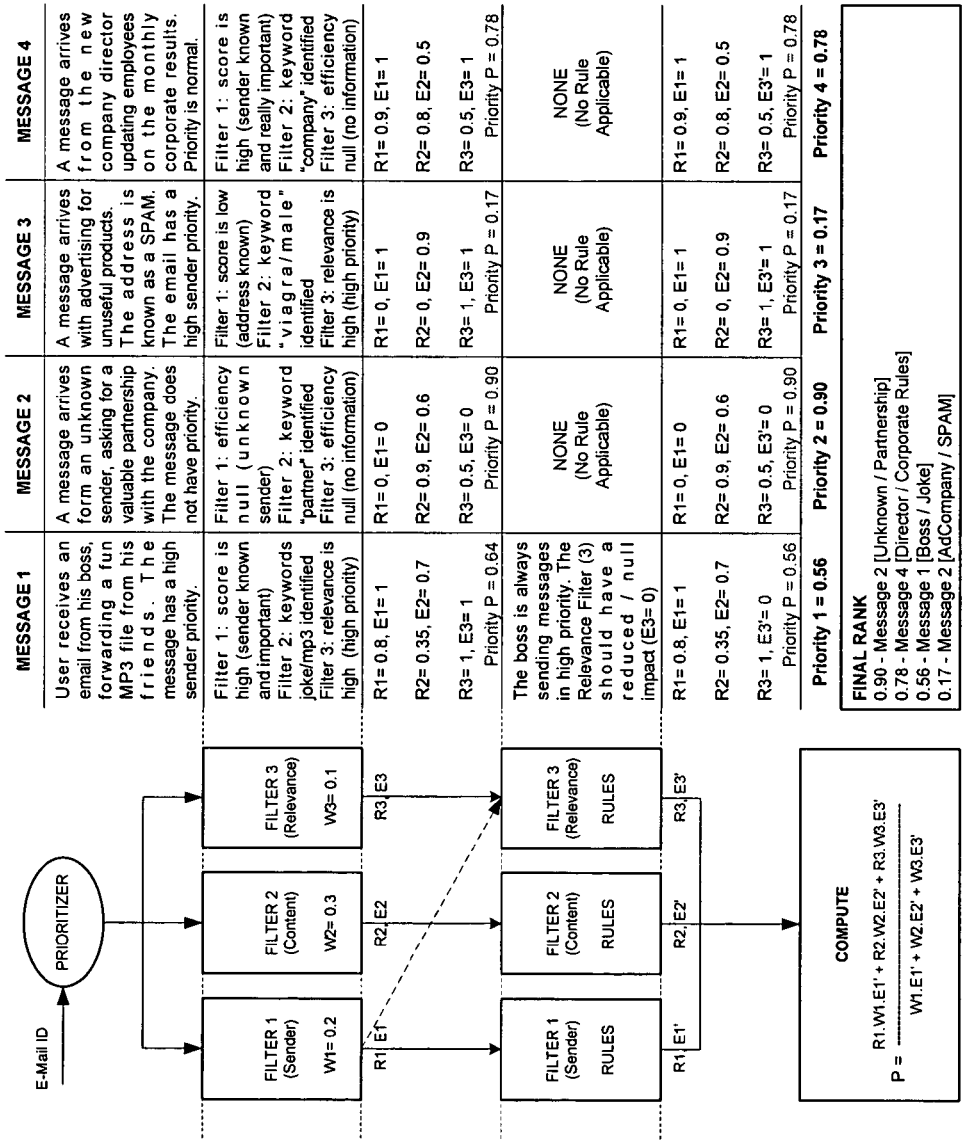
FIG. 8 illustrates a calculation process utilizing three different filters for an Inherent analysis filter in accordance with an embodiment of the invention.

To illustrate the above implementation, an example is shown in FIG. 8. In the example, the Priority Value is calculated using three different types of filters.

Certain embodiments are disclosed in Table 1 to disclose various types of Inherent filters.

3.6) Illustrative Examples of Certain Embodiments: Relevance & Importance Priority Evaluation a) Relevance and Importance can trade-off against one another; an important message may have low Priority if its Relevance is low; conversely, a relevant message may have low Priority if its Importance is low b) Because Relevance is driven by Situation Context, the very same message can vary in Relevance to the same recipient from Time1 to Time2 c) Because Relevance is driven by Situation Context, the very same message can differ in Relevance to different recipients d) Example: A recipient receives a message from his boss. The boss is inherently important, and he has marked the message as "high" priority. But the boss always sends "high" priority messages, so the Relevance of this message (at least as determined solely by the priority marking is low or even 0). Therefore, the message priority is lower than it would otherwise be.

e) Same example as in 1, but the boss "knows" that he always sends "high" priority message, and he intuitively suspects that this lack of variability will diminish the message's relevance in the recipients' eyes (or he has noticed it because of lack of response on the recipient's part). He therefore creates a new category ("urgent") to create variability in the recipient's eyes, thereby driving Relevance up.

f) Sometimes it is the Status Quo which is used as the basis against which Relevance is partially determined. By this reckoning, messages on new subjects (relative to the Status Quo) will be more relevant that a message that is one of several in the same subject thread.

g) The sender of a message is unknown. It either stays as unknown, or perhaps as the result of logic, is guessed at based on an attribute such as address. The credibility of this "Result" is therefore in question, and therefore the impact of the "sender" identity on message priority must be diminished. In this case, the uncertainty surrounding an attribute's value gets "reverse scored", in that its greater variability lessens, not increases, its Relevance.

h) Some Examples:
User X always gets short messages (either in general or from sender Y), but now gets a long one (Relevance increases)
User X always gets English messages, but now gets one in French (Relevance increases)
User X is currently working on Tasks Y and Z within his organization. Message A, either subject header or summarization analysis, pertains to topic Y (high co variability), so it is important to User X.
Same example as before, but User X notices that the subject header (and perhaps date and message size) are exactly the same (i.e., no variability) as a previous message, therefore Relevance is 0 and message priority is 0 even though Importance is still measured as high i) The sender of a message is the "boss", and so a strong, static component to message Importance exists. This static component can be augmented by filters that assess the similarity of the message summary to topics of interest to the user, or other co-variability based filters.

4) GUI Module (FIG. 1 FIG. 19-24)

The GUI module [109] comprises of a Graphical User Interface [106] and a portion of Adaptive Learning [107]. In one embodiment, the GUI can be a pop window with customizable views i.e. full view, medium-view, mini-view which can stay open (like Instant Messaging pop-up windows) along with other application windows simultaneously open on the user's desktop machine. In another embodiment the GUI can be an independent email messaging application. Another embodiment includes applications where the system can integrate with any other independent email client applications or internet email applications with or without that email client application being launched or opened simultaneously. The applications of the invention may also include whether the full or smaller version of the system can be implemented on hand-held devices or cell phone. Other application may include a customizable functionality of text to voice conversion of the summarized messages [2104, 2105] for a busy user to listen to the executive summary of his/her electronic messages (while the user is unable to look at the screen such as driving or busy in the other work, or using a small screen device).

Figure 19:
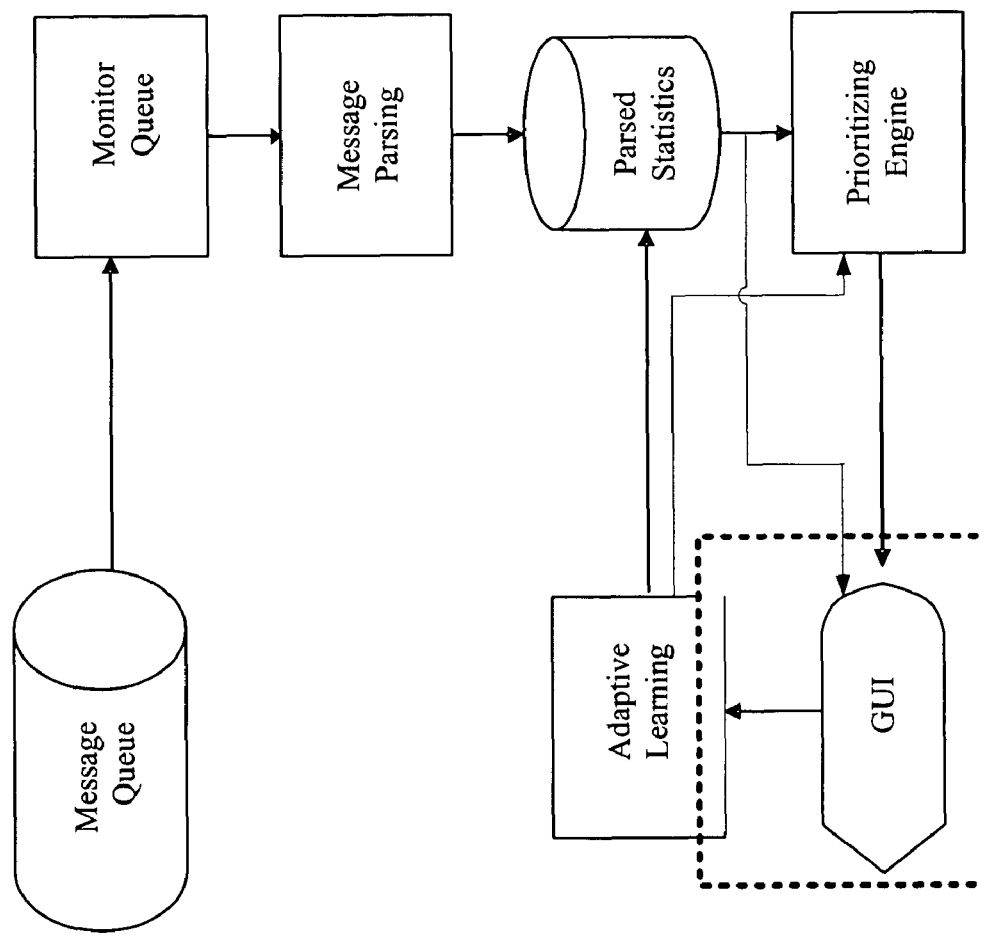
FIG. 19 illustrates the flow of data received from, and sent to, external modules by a GUI in accordance with an embodiment of the invention.

4.1) GUI System (FIG. 1, FIG. 19)

The graphical user interface (GUI) displays the information that may assist the user to improve his/her message reading, message processing, work planning, productivity and most importantly the quality of overall email interaction experience. To this aim in one of the embodiment, several visual elements inform the user of the overall priority categorization [2027, 2202]; its relative priority ranking [2025, 2201] within a particular priority class; executive summary of the individual message [2209]; and key words [2031]. The message summary frame [2104, 2107] can be considered as a user's work bench where the action items (email messages) are presented in order of the user-defined priority; quick decisions can be taken and the individual items can be removed from the view [2004, 2030, 2206] when the actions items are completed (electronic messages processed or filed for later processing).

In another embodiment GUI displays several fast-action buttons [2032, 2211-13, 2310-12] that allow the user to quickly take some actions on the message currently displayed.

Other embodiments of the GUI contain mechanisms to learn and improve its message prioritization classification based on the user feedback. Several regions of the GUI are intended to collect information from the user.

At a message summary frame level (FIG. 21), the user can provide feedback to the application by selecting a whole message or a word/textual element included in it and assigning to it a classification (e.g., select the word "insurance" in a message subject or summary and give it a high priority). At a complete message level, the user can provide feedback to the application by selecting the whole message or a word/textual element included in it. As illustrated in FIG. 1, these feedbacks are used by the prioritization and, to some extent, the message summarization processes.

In another embodiment a GUI also provides several ways to display the list of messages using multiple criteria that might be combined. These criteria may include one or more of the following: overall computed priority, associated user notes, and conversation thread along with the conventional methods based reception date, sender, and type of attachments.

4.2) Process and Implementation of GUI System (FIG. 19, FIG. 20-22, 22a)

As depicted in FIG. 19 (and FIG. 1), the process of displaying, processing and learning from electronic messages comprises several steps. A monitor [102] observes a message queue [101]. Arriving messages are parsed [103] and statistics are extracted [104]. A prioritization algorithm [105] computes the priority of the messages, and then the GUI [106] is responsible for displaying these messages. As the end-user acts on the GUI, user's behavior is monitored and used to feed back [107] the overall system.

Figure 20:
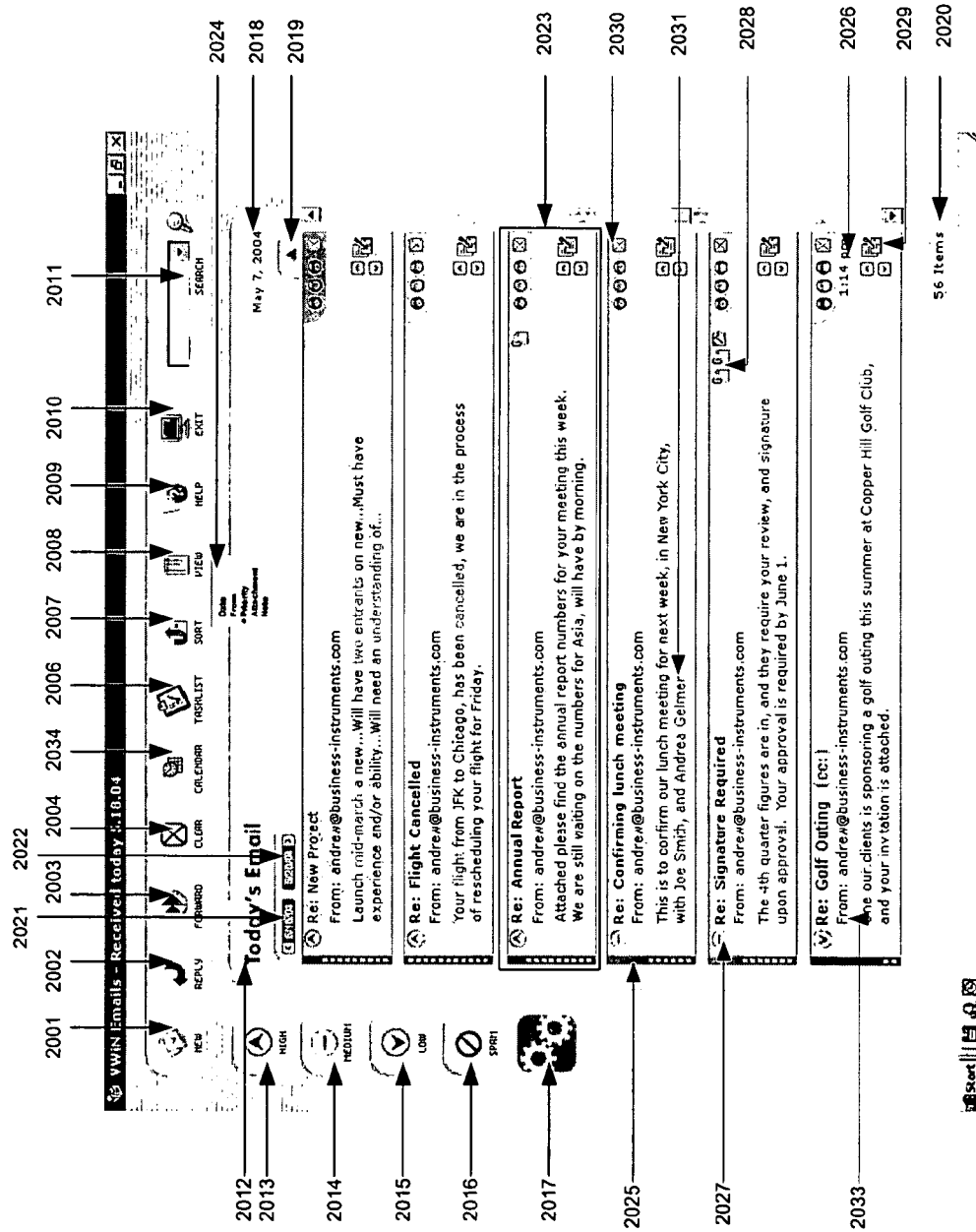
FIG. 20 illustrates a main GUI for a message viewing application.
Figure 21:
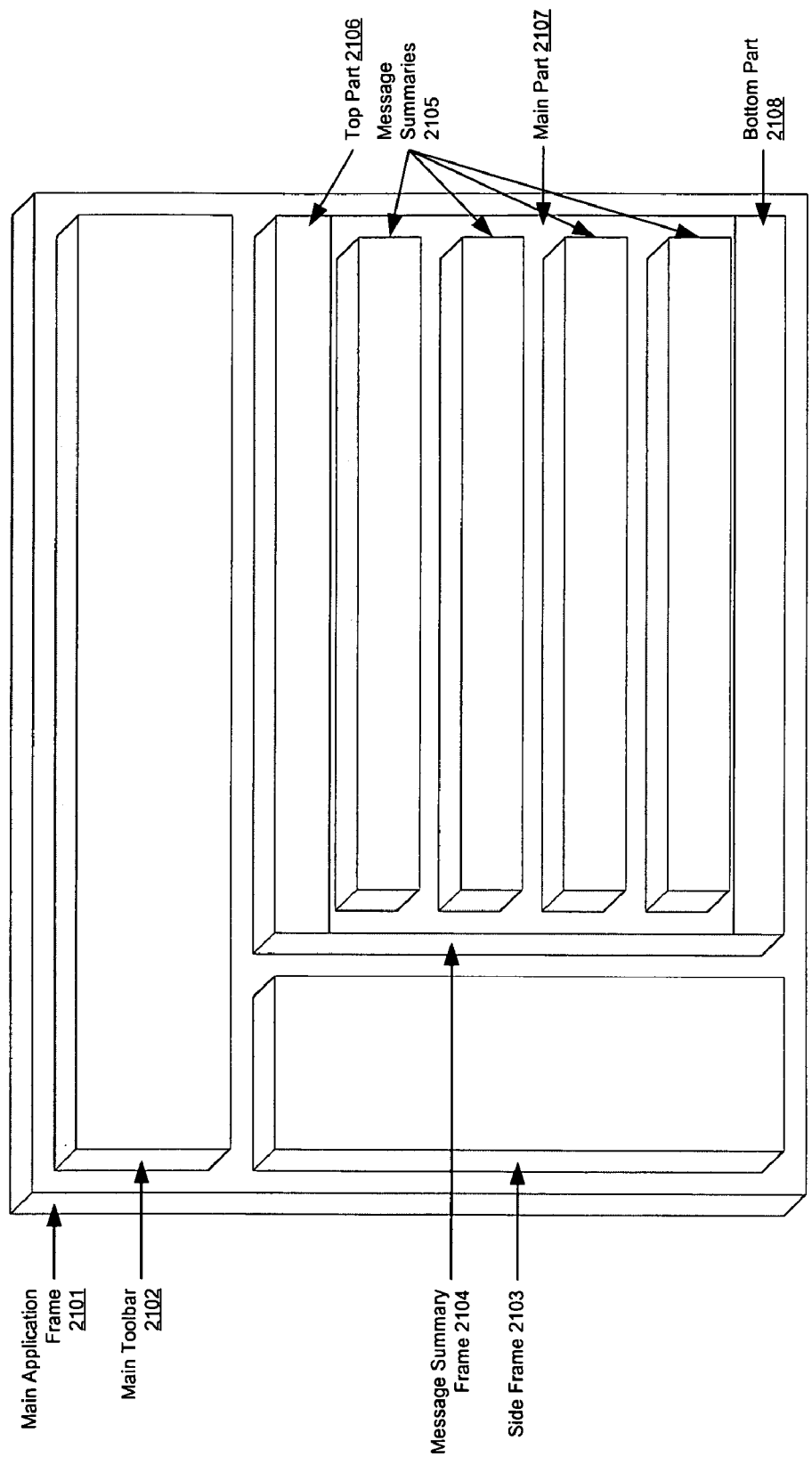
FIG. 21 depicts different areas within the GUI illustrated in FIG. 20.

The message viewing and processing GUI [106] includes of several windows. The main GUI as shown in FIG. 20 is the start window. At the launch, this window appears and presents a list of messages [2023], based on the default sorting option. This main window is further detailed in FIG. 21 and FIG. 22. A complete description of the GUI process and implementation is disclosed below:

4.2.1) Main Toolbar Area [2102]:

The main toolbar is placed on the top part of the main application frame [2101]. It is made of the main action buttons related to the messages' management. These buttons are:

Draft (button) [2001]: It opens a separate window that contains a new blank electronic message in an electronic message client application;

Reply (button) [2002]: It opens a separate reply window of an electronic message client application;

Forward (button) [2003]: It opens a separate forward window of an electronic message client application;

Clear (button) [2004]: It removes the select (highlighted) summarized message from the main form and marks it as done (task finished or task cleared) for future accesses;

Sort (button list) [2007]: It displays a drop-down menu of sorting options [2024]:

Date [2024, first option]: It changes the summarized messages displayed in the main window. The messages appear sorted by date and time (and not in the order of their prioritization score).

From [2024, second option]: It changes the summarized messages displayed in the main window. The messages appear sorted by sender name (and not in the order of their prioritization score).

Priority [2024, third option]: It changes the summarized messages displayed in the main window. The messages appear sorted by priority i.e., high, medium, low, or spam. This is a default setting of the application.

Attachment [2024, fourth option]: It changes the summarized messages displayed in the main window. The messages appear sorted by type (then name) of attachments (and not in the order of their prioritization score).

User-Note [2024, fifth option]: It changes the summarized messages displayed in the main window. The messages appear sorted by user-note e.g., does the message has a user's written note or not? (and not in the order of their prioritization score).

Search [2011, text field area and button]: It changes the summarized messages displayed in the main window. The text entered in the search text field area defines what messages will appear (e.g., if the user enters "insurance", then all the messages that contain this word will be displayed in a specific order);

Calendar (button) [2034]: It displays the calendar view of an electronic message client application;

Task List (button) [2006]: It displays the task list view of an electronic message client application;

Folder Filing Rules: The system files messages automatically based on pre-set rules and their priority levels. User can create rules or can use rules from the existing art email client. In one embodiment, junk email will be redirected to the current embodiment's 'junk' folder or the junk folder of the existing art email client.

View (button list) [2008]: It displays a list of drop-down menu of separate windows (not shown) which can display/hide as described below:

Folders: It opens/closes a contextual pop-up window (not shown) that contains a tree view explorer of the user's message folders from an electronic message client application;

Message Priority: It opens/closes a pop-window (not shown) that contains check box list of all the message priorities (High, Medium, Low, and Spam) which are permitted to be shown in the GUI. By default all the boxes are checked i.e. message summary frame [2107] will show all the messages belonging to all the prioritization categories (in the selected date range [2021] to [2022]). If a busy user would like to view only the High priority messages, he can do so by only checking-on to the high priority box (and checking-of the remaining three boxes).

Keyword Priority: It opens/closes a contextual pop-up window (not shown) that contains an editable table of the keywords with their associated level of priority (categorized as high, medium, low, spam). Example, sender's email address may be pulled from the repository as one of the keywords.

Jargons Dictionary: It opens/closes a contextual pop-up window (not shown) that contains an editable menu of all the Jargon Files, and important words/jargons associated with each of the jargon files (e.g. work, business, personal, education, sports, hobby).

Preferences: It opens a pop-up window (not shown) that contains detailed customizable system administrator type options of the application, which will be used only rarely. This include one or more of the following: Ability of update/share/store prioritization database at a local or central level, the time interval to check for the new incoming messages, customize the buttons and their location preferences, customize the color coding system for representing high, medium, low or spam categories, and the overall prioritization score classification ranges.

Help (button) [2009]: It opens a separate window that contains the help information;

Exit (button) [2010]: It exits the application and saves the preferences.

4.2.2) Side Frame [2103]:

This area [2103] shows some icons utilized to either change the priority of a message or of a key word. The area is made of the following priority buttons:

High [2013, also refer 2305] (button): It changes the priority of either a key word or a whole electronic message to high or keeps it unchanged if it already has a high priority;

Medium [2014, also refer 2306] (button): It changes the priority of either a key word or a whole electronic message to medium or keeps it unchanged if it already has a medium priority;

Low [2015, also refer 2307] (button): It changes the priority of either a key word or a whole electronic message to low or keeps it unchanged if it already has a low priority;

Spam [2016, also refer 2308] (button): It changes the priority of either a key word or a whole electronic message to null or keeps it unchanged if it already has a null priority.

Progression Icon [2017]: This icon becomes animated when one or more new incoming messages are received and being processed by the prioritization module to let a user know that the message(s) will soon be updated in the GUI. A user setting can also be permitted to run the refresh operation of the GUI after every certain time interval or on the click of the Progression Icon button.

4.2.3) Top Part [2106] of the Message Summary Frame [2104]:

This part [2106] indicates to the user what is the date range for the message currently being displayed Today Date [2018]: It displays the current date (e.g., Thursday, May 20, 2004).

From-To: It displays the date range of the messages currently being displayed. This area includes the following elements:

From Text: It displays the text "From";

From Text Field Area [2021]: The date entered in the From Text Field Area defines what messages will appear (e.g., if the user enters a past date, then all the messages received between this date and the date in the field "to" will be displayed in the order currently defined by the sort button [2019]). It opens a smaller pop-up window displaying a month calendar to select the date. When the end-user has clicked on a date, the pop-up window disappears;

To Text: It displays the text "To";

To Text Field Area [2022]: The date entered in the To Text Field Area defines what messages will appear (e.g., if the user enters the current date, then all the messages received between the "from" date and today will be displayed in a specific order currently defined by the sort button [2019]). It opens a pop-up window displaying a month calendar to select the date. When the end-user has clicked on a date, the pop-up window disappears;

Sort Order Arrow [2019]: It depicts the direction of the sort (e.g., 'up' arrow it is ascending order and 'down' arrow if it is descending order).

4.2.4) Main Part [2107] of the Message Summary Frame [2104]:

This main part [2107] presents a list of Summarized Messages arranged in a prioritization order. It can also present the summarized messages list resulted from the search/sort operation(s).

Following is the General Behavior:

This area [2107] can be considered as a user's work bench in which the open action items (electronic messages) are presented in order of their priority (prioritization is customized to user work behavior). The user can view the entire message by double-clicking on the summarized-view message.

The message list is updated whenever one or more new incoming messages are received and processed by the prioritization system, or after a search/sort operation Once a particular action item is take care by the user (either by replying to the message [2002], forwarding [2003], just reading for information purposes, or completing desired actions based on the email, or filing in the folders [2008], or added in calendar [2034] or task list [2006] or assigned as a spam [2016] or changing/assigning priority classification [2013-2016], etc.) the work bench [2104] needs to be cleared up [2004, 2030, 2206] so that the remaining items can be now be taken care by the user.

A user can also set the view [2008] settings for only one, more than one, or any combination of high, medium, low and spam category messages. This embodiment is very useful for a busy user who has set up this application to show him only the high and medium priority messages (from the first day of his use till today). For example, he has reserved one day in every month where he has enough time to review his remaining email messages (falling in low and/or spam category). The user can do that by simply selecting the suitable date range [2021, 2022] and priority classification [2008] (checking-on low and spam boxes, and checking-off high and medium priority boxes). The best thing is that even the remaining messages are arranged in the order of their priority scores along with their summarized views to further improve user's productivity.

At the end of the day, when the user has no email messages left to view in the work bench (assuming user's setting are set up, he/she will know that all the emails are taken care and nothing slipped his/her attention (of course, the user also has to look at his calendar, task list and other planned items).

The first (top) message is highlighted and selected by default when the application is launched;

As the user scrolls down or selects another message (by clicking on it), the new one becomes highlighted while the previous one restores its default layout except its Subject Line which loses its bold attribute.

4.2.5) Bottom Part [2108] of the Message Summary Frame [2104]:

This part [2108] provides quantitative data regarding the number of messages in the current view which are yet to be processed or cleared by a user:

Remaining Items [2020]: It is the number of messages that remain in the current view (i.e., how many messages need to be processed).

Figure 22:
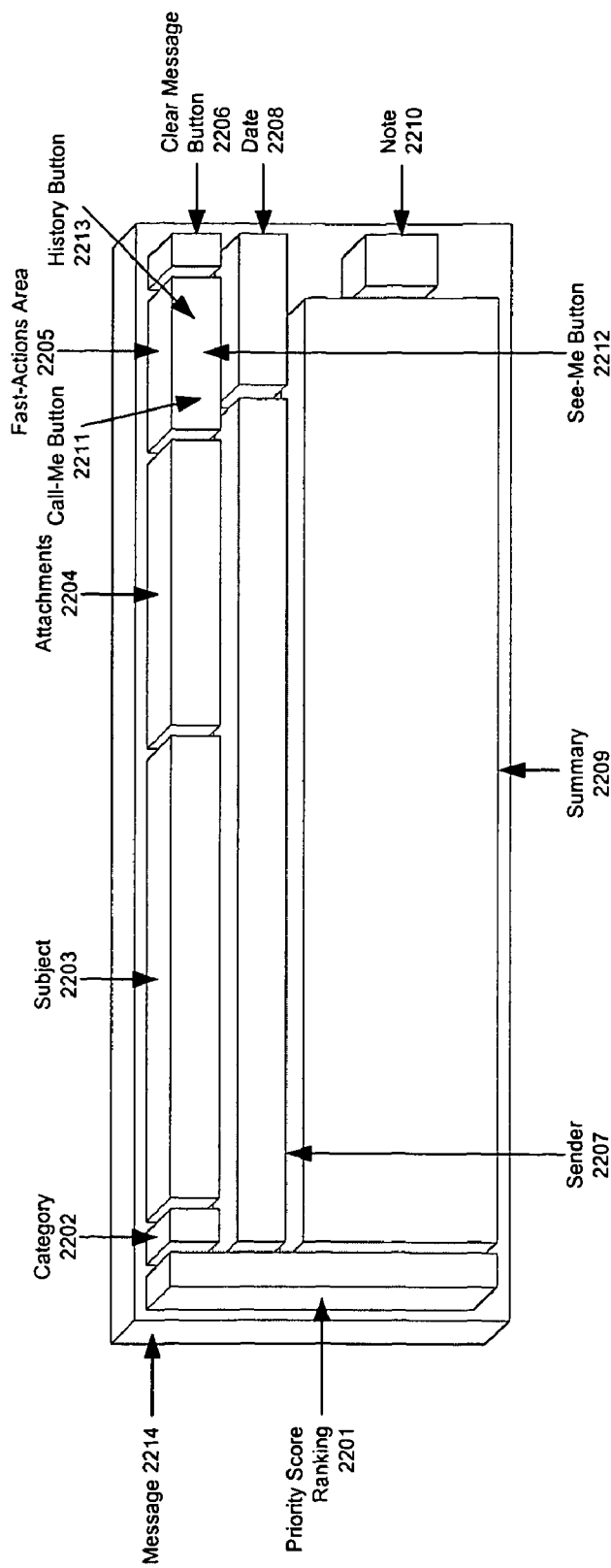
FIG. 22 depicts the different portions within the message summary area depicted in FIG. 20.
Figure 23:
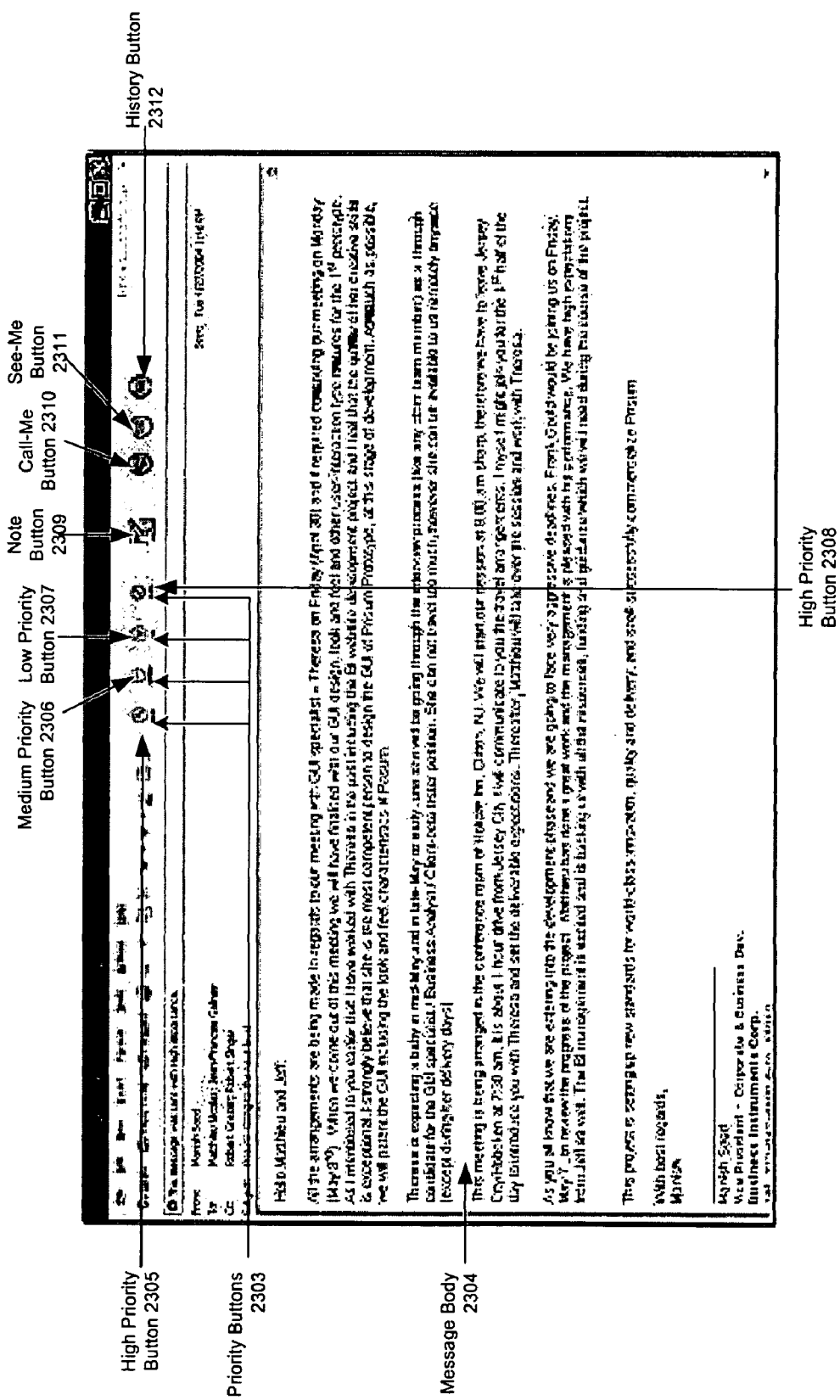
FIG. 23 illustrates a look-and-feel for the message window and toolbar of FIG. 20.
Figure 23A:
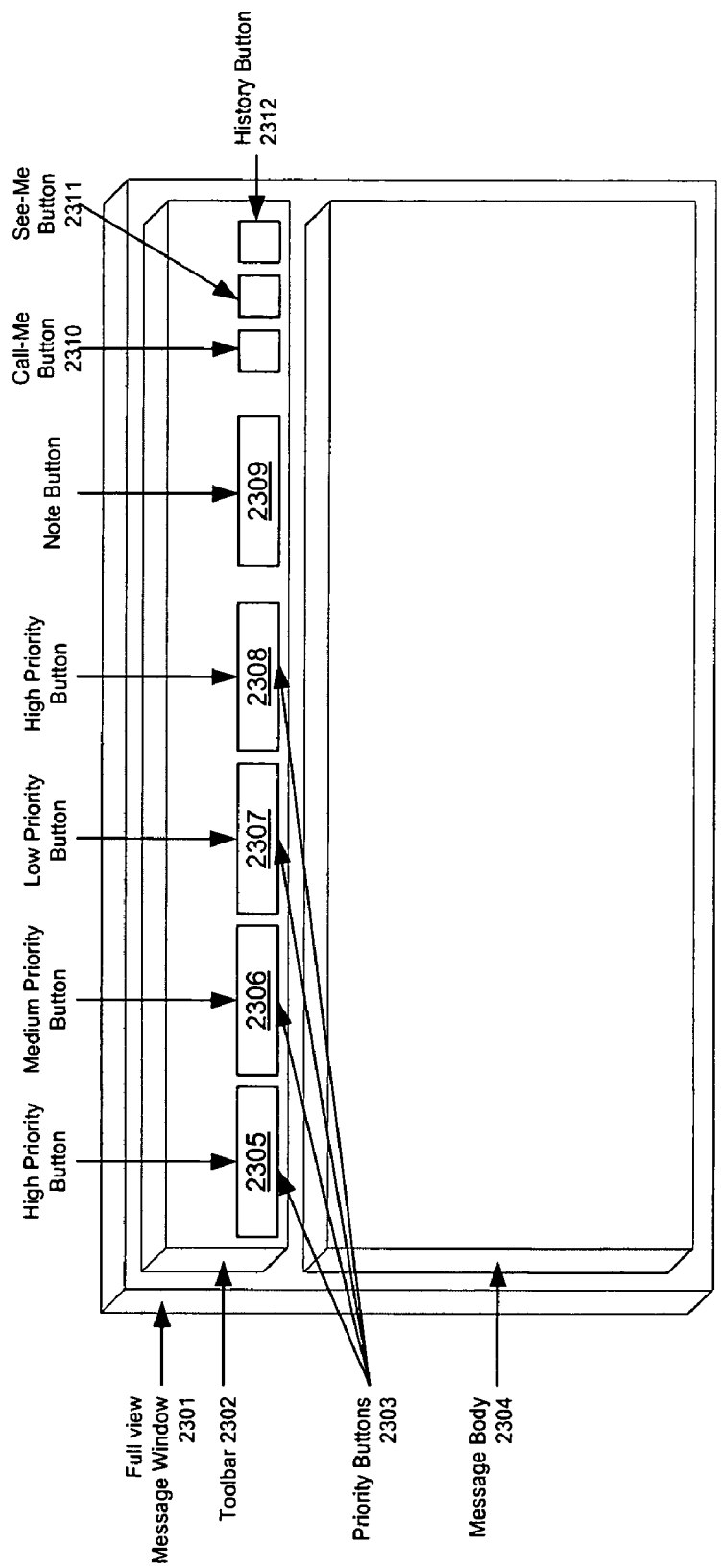
FIG. 23a depicts an individual message window area containing a complete message and an application specific toolbar in accordance with an embodiment of the invention and Table I discloses various types of Inherent filters in accordance with described embodiments of the invention.

4.2.6) Message Summary [2023, 2105, FIG. 22, FIG. 23, 23a]:

A summarized message is made of different components listed below:

Priority Categorization Icon [2027, 2202]: This symbol visually indicates the overall priority categorization status of a message as calculated by the prioritization module (e.g., whether the message is a high, medium, or low priority or whether it is a spam). These icons may resemble the respective priority buttons [2013 to 2016, 2305 to 2308]. The objective of this presentation is to let a user know of the priority classification of a message without opening the complete message;

Priority Score Ranking [2025, 2201]: It visually indicates the overall priority score (from 0.00 to 1.00) of a message as represented on a scale. In another embodiment the ranking bar changes its color depending upon the prioritization categorization of a message (high, medium, low or spam). The objective of this presentation is to let a user know of the relative ranking of a message within a specific priority classification. For example in FIG. 20 there are three high priority messages (at the top), with the help of the priority score bar the user will know which one is the highest priority message and how the other two messages rank as compared to the former.

Message Subject [2203]: It is the subject field of the electronic message;

Date/Time [2026, 2208]: Depending on the sort options, this field represents either the time of the day or both the date and time at which a message was received (e.g., if only today's messages are displayed as depicted in FIG. 20 then only the time is showed, else both the time and date appear instead of just the time);

Attachment Icons [2028, 2204]: These icons are associated to each of the attachments that the electronic message includes, up to a maximum of five attachments. If the message contains six or more attachments, then only the five first are depicted in this area along with a symbol directing a user to open the complete message to view all the attachments. The icons used to depict the attachments mimic those of the operating system's explorer; by double-clicking clicking on these icons the respective file attachments can open up.

User-Note (button) [2029, 2210, 2309]: This feature allows a user to write quick written notes and clip them to the individual messages as he/she is going through the list of messages or any individual message. In one embodiment by clicking on this icon it opens up a smaller pop-up notepad window (not shown). When any notes are added (or edited) and saved the User-Note icon becomes highlighted. This visually depicts to the user which messages out of whole list have associated user-notes (annotations, action items) so that he can prioritize his work plan accordingly. In another embodiment the user can sort the messages based on the attached user-notes.

Clear (button) [2004, 2030, 2206]: By clicking on this button it removes the selected message (or list of messages) from the main form [2104] view and marks it as 'cleared' for future access.

From [2033, 2207]: It displays the name and/or electronic address of the electronic message's sender. If the user is not the direct recipient of the message, then this information is followed by the mention of 'cc' or 'bcc' between brackets [for example e.g. andrew@abc.com (cc)].

Summary Area [2209]: It displays a summarized version of the message body includes of:

Summary [2209]: It is a summary of the electronic message body (for details refer to 214, 212, 405, and 406]. Double-clicking (or Right-click contextual menu selection) on the summarized-view will open the entire message in a new window in the current embodiment or in the existing art email client systems.

List of Links: It is a list of the links extracted from the message and their associated commentary (for details refer to [217]).

Scroll Bar [2033]: If the summary information is too long to be completely displayed in the summary area, then it allows the navigation inside this summary area.

4.2.7) Fast-Action Buttons [2032, 2211-13, 2310-12]:

These buttons allow the user to perform fast actions on the messages. In one embodiment these buttons can be useful for busy managers or supervisors who prefer that the sender of the message be directed to take an action based on the electronic message sent by him. By clicking on the respective buttons a pre-defined message response is electronically sent to sender of the message along with any scheduling preference of the user. The draft of the sent message can be customized to suit the work habits of a user.

Call-Me (button) [2211, 2310]: By clicking on this button a smaller pop-up windows of time/date schedules will be displayed. The user can select time/date when he/she wants to be contacted by phone by the sender of the electronic message. After finalizing the time/date schedule, the user clicks a send button located within the pop-up window, it will automatically send an electronic message based on a predefined text to the message sender (e.g., _Sender_name_, please call me at _date_time_to further discuss your message _ message_subject_line_;

See-Me (button) [2212, 2311]: By clicking on this button a smaller pop-up window of time/date schedules will be displayed. The user can select time/date when he/she wants to meet with the sender of electronic message. After finalizing the time/date schedule, the user clicks a send button located within the pop-up window, it will automatically send an electronic message based on a predefined text to the message sender (e.g., _Sender_name_, please meet me at _date_ time_to further discuss your message_message_subject_line_);

History (button) [2213, 2312]: By clicking on this button it will update the message summary frame [2104]. The message summary frame will now display all the messages that belong to the same conversation thread as that of the message being selected (at the time of clicking the button);

5) Adaptive Learning Module (FIG. 1)

5.1) Adaptive Learning System (FIG. 1):

The adaptive learning System [107] aims to refine the results obtained by the prioritization engine [105] to fit as closely as possible to user behavior. The Learning Module is independent from the prioritization engine. It continuously monitors for any feed back signals based on the user interaction with GUI. For example, it will monitor if attributes have been associated or updated with respect to the message i.e. if the user has clipped any User-notes. It will also monitor whether there are changes in the system's keyword priorities. Various feedback signals such as these will be added to informational and situational context repository [104] and Prioritization Engine [105], and then, the message priority is re-evaluated [105] based on this data. This new user behavior information will be taken into consideration while calculating the priority value.

5.2) Process and Implementation of Adaptive Learning System

Two approaches are used: 5.2.1) intentional input or supervised learning data which is intentionally given by the user; and 5.2.2) unintentional input or unsupervised learning data which comes from the user's normal use of the GUI.

A key word [2031] can be a name or a contact email address, URL, number, alphanumeric, or a word or set of words selected from Message Summary [2033 or 2209], Message Body [2304], Message Subject [2203], or From field [2033, 2207].

5.2.1) Intentional or Supervised Learning Data Gathering:

Supervised learning methods rely on user actions to teach the system about prioritization. The GUI learning framework is implemented via four priority buttons [2303] (high, medium, low, and spam) for the keyword learning process and the categorization. These buttons are located in the side frame [2103] of the main application frame [2101]; and in the toolbar panel [2302] of an individual message window ([2301], FIG. 23, 23a)

In one of the embodiments, a key word can be selected and dragged and dropped (using mouse click button or key board) on one of the priority buttons to assign (if it's a new key word) or change (if the key word is already in the priority database) the key word's priority.

Users can use two methods to adapt the system: a) add or change keywords' priority and b) change an entire message's priority.

a) Keyword Prioritization:

While reading a message (in summarized view [2105], or complete message view [2304]), if a user wants to change the priority of a keyword, he/she can select it and drag and drop it on the following areas:

High priority [2013, also refer 2305]: the keyword priority is increased; the word is more susceptible to appear in summaries and is taken into account in the priority Medium priority [2014, also refer 2306]: depending on the current grade of the keyword, priority can be reviewed to match the average (increased or decreased)

Low priority [2015, also refer 2307]: the keyword priority is decreased; the keyword is less susceptible to appear in summaries and is not taken into account in the priority anymore Spam priority [2016, also refer 2308]: the keyword priority is set to zero. The key word will henceforth be rejected from message summaries.

In another embodiment, the user will also be able to enter key word(s) directly by selecting a key word message (in summarized view [2105], or complete message view [2304]) and then right clicking on it. A context menu appears which allows the user to select the appropriate category for this key word (i.e., high, medium, low or spam).

The keyword(s) can also be prioritized by selecting the key word(s) and then clicking on one of the priority buttons [2013-2016 or 2305-2308].

In other embodiment, a user can view his/her entire database of all the keywords by double clicking on any priority button [2013-2016, or 2305-08]. This will open up a new pop-up window displaying a table containing all four prioritization categories and all their respective key words. The key words within the table can be edited (added, deleted, updated) either by manually typing or editing a key word, dragging and dropping from the message or dragging and dropping from one category to another category in the table. By clicking on the save button, all the changes made in the keyword table can be confirmed. Another embodiment enables a user to store his keywords database locally, electronically send the keyword file to another user(s) so that he/she can input it his/her prioritization system. Another variation of the system stores the data centrally on an organization wide basis (with specific user right assigned in terms of ability to edit or view the data).

b) Entire Message Prioritization:

In this case, the user can assign a specific priority to a complete message entity. To this aim, the user selects the desired message [2023] in the message summary frame [2104]. Once the selection is done, the user can either drag or drop the selection to the appropriate priority button [2013-2016, or 2305-08], or right click it to open a contextual menu and the user can choose its appropriate category. In that case, all the key words from the message (including Message Summary [2033 or 2209], Message Body [2304], Message Subject [2203], or From field [2033, 2207]) extracted during the Message Parsing system [206] are assigned the selected desired priority level.

5.2.2) Unsupervised Learning Data Collection:

The embodiments do not have to be in direct charge of the unsupervised learning methods. Its objective is to monitor the end-user behaviors and provides all the collected data to the adaptive learning module [107], therefore improve the performance of the prioritization filters.

The application GUI monitors the facts that messages have been opened/cleared/read or not, etc. that provide a feedback to the independent adaptive learning module [107].

From a Message Summary View

The GUI sends to the external adaptive learning modules one or more of the following actions performed done by the user:

a) The user marks a message as cleared or attended to [2030, 2206]

b) The user opens the full content of message [FIG. 23, 23a] by double-clicking on the summarized view [2023]

c) The user skips few messages in high-priority messages and selects a relatively lower priority message in the summarized view list [2105]

d) The user writes a note on a message [2029, 2210]

e) The user replies [2002] and/or forwards [2003] a message

The above described embodiments of the present invention can be integrated with any electronic messaging client applications, and is operable with or without that client application being launched or opened. Further, embodiments can also be an independent electronic message client application in itself. Embodiments of the invention can also be versions that can be implemented on minicomputers, mainframe computer, personal computer, hand-held computing devices, microprocessor based or programmable consumer electronics and other like devices such as cell phones, pagers, etc.

Embodiments of the invention can also include a functionality of text-to-voice conversion of the summarized messages so that a user can listen to the executive summary of his/her electronic messages. Embodiments can also be applied to include Voice Mail, Electronic Mail, Instant Message conversations, alerts, meeting requests and confirmations, task assignments, organization-wide document search and web search results Thus, while there have been shown, described, and pointed out fundamental novel features of the invention as applied to several embodiments, it will be understood that various omissions, substitutions, and changes in the form and details of the illustrated embodiments, and in their operation, may be made by those skilled in the art without departing from the spirit and scope of the invention. Substitutions of elements from one described embodiment to another are also fully intended and contemplated. The invention is defined solely with regard to the claims appended hereto, and equivalents of the recitations therein.

TABLE 1

| INHERENT FILTERS DESCRIPTION FOR Emails | |
|---|---|
| Filter Number: | 1 |
| Filter Reference: | INHERENT/CONVERSATION/PARTICIPANTS/ACTIVE |
| Description: | Increase/Decrease the relevance of an email if the participants are known (included in the personal hierarchy) |
| Filter WEIGHT: | 0.5 |
| RESULT Calculation: | Average of the results obtained with the same calculation as the sender for each of the participants (see 1.2) |
| EFFICIENCY Calculation: | Average of the efficiency obtained with the same calculation as the sender for each of the participants. |
| Filter Number: | 2 |
| Filter Reference: | INHERENT/CONVERSATION/CURRENT_EMAIL/SENDER |
| Description: | Increase/Decrease the relevance of an email if the sender is known (included in the personal hierarchy) |
| Filter WEIGHT: | 1 |
| RESULT Calculation: | Check if the sender is in the personal hierarchy of the user, if so RESULT is given according to its rank (0: SPAM, 0.35: LOW, 0.65: MED, 1: HIGH). If not, check if the user is in the Exchange directory, if found the value 0.75 is assigned to RESULT. If not, check if the email address matches the user's one, if yes assign the value 0.75 else RESULT = 0 |
| EFFICIENCY Calculation: | If the user is known (found either in the personal hierarchy or in the Exchange server) EFFICIENCY = 1, else if guessed based on the address EFFICIENCY = 0.5, else EFFICIENCY = 0 |
| Filter Number: | 3 |
| Filter Reference: | INHERENT/CONVERSATION/CURRENT_EMAIL/RECIPIENTS |
| Description: | Increase/Decrease the relevance of an email if the recipients are known (included in the personal hierarchy) |
| Filter WEIGHT: | 0.75 |
| RESULT Calculation: | Average of the results obtained with the same calculation as on the sender for each of the recipients. (see 1.2) |

TABLE 1-continued

INHERENT FILTERS DESCRIPTION FOR Emails

| | |
|---|---|
| EFFICIENCY Calculation: | Average of the efficiency obtained with the same calculation as the sender for each of the recipients. (see 1.2) |
| Filter Number: | 4 |
| Filter Reference: | INHERENT/CONVERSATION/CURRENT_EMAIL/RECIPCC |
| Description: | Increase/Decrease the relevance of an email if the recipients are in CC or BCC |
| Filter WEIGHT: | 0.75 |
| RESULT Calculation: | Count the number of recipients in CC and in BCC. Given the maximal range on the existing emails, assign a percentage according to the calculated number (if range equals 0 to 10 and number equals 6 then RESULTS = 60%). If an email has more than 25% over the CC number average, then RESULT = 1. If nobody is in CC or BCC then RESULT = 0 |
| EFFICIENCY Calculation: | If some persons are in CC or BCC, then the EFFICIENCY = 1, else EFFICIENCY = 0.5 (no CC or BCC should always be taken into account) |
| Filter Number: | 5 |
| Filter Reference: | INHERENT/CONVERSATION/CURRENT_EMAIL/USERCC |
| Description: | Decrease the relevance of an email if the user is in CC or BCC |
| Filter WEIGHT: | 0.5 |
| RESULT Calculation: | Check if the user is the direct recipient or in CC or BCC. If the user is in CC/BCC (message for information) then RESULT = 0 else RESULT = 1 |
| EFFICIENCY Calculation: | If the user is in CC or BCC, then EFFICIENCY = 1, else EFFICIENCY = 0 |
| Filter Number: | 6 |
| Filter Reference: | INHERENT/CONTENT/EMAIL/SUBJECT |
| Description: | Increase/Decrease the relevance of an email if keywords are identified in the subject |
| Filter WEIGHT: | 0.85 |
| RESULT Calculation: | Compare the subject words to the personal/position/corporate/industry jargons. Result is the average of the score given for each of the keywords. The score is defined by the rank (0: SPAM, 0.35: LOW, 0.75: MED, 1: HIGH) if existing. If not on their importance, compare to the range of words in the jargon. A weight of 3 is given to the personal jargon in the average, 2 for the position and the corporate jargon and 1 for the industry. |
| EFFICIENCY Calculation: | Efficiency is based on the number of keywords matching compared to the average for the category (how many keywords are usually contained in the email subjects/how sure we are of the category) + 0.5. EFFICIENCY = 0.5 if none of the jargon matched (wanted or unwanted words), else EFFICIENCY = 1 If the language is unknown EFFICIENCY = 0 |
| Filter Number: | 7 |
| Filter Reference: | INHERENT/CONTENT/EMAIL/BODY |
| Description: | Increase/Decrease the relevance of an email based on its content/keywords |
| Filter WEIGHT: | 0.95 |
| RESULT Calculation: | Compare the subject words to the personal/position/corporate/industry jargons. Result is the average of the score given for each of the keywords. The score is defined by the rank (0: SPAM, 0.35: LOW, 0.65: MED, 1: HIGH) if existing. If not on their importance, compare to the range of words in the jargon. A weight of 3 is given to the personal jargon in the average, 2 for the position and the corporate jargon and 1 for the industry. |
| EFFICIENCY Calculation: | Efficiency is based on the number of keywords matching compared to the average for the category (how many keywords are usually contained in the email body/how sure we are of the category) + 0.5. EFFICIENCY = 0.5 if none of the jargon matched (wanted or unwanted words), else EFFICIENCY = 1 If the language is unknown EFFICIENCY = 0 |
| Filter Number: | 8 |
| Filter Reference: | INHERENT/CONTENT/ATTACHMENT/NAME |
| Description: | Increase/Decrease the relevance of an email given the name of the attachment |
| Filter WEIGHT: | 0.75 |
| RESULT Calculation: | Compare the subject words to the personal/position/corporate/industry jargons. Result is the average of the score given for each of the keywords. The score is defined by the rank (0: SPAM, 0.35: LOW, 0.65: MED, 1: HIGH) if existing. If not on their importance, compare to the range of words in the jargon. A weight of 3 is given to the personal jargon in the average, 2 for the position and the corporate jargon and 1 for the industry. |
| EFFICIENCY Calculation: | Efficiency is based on the number of keywords matching compared to the average for the category (how many keywords are usually contained in the attachment name/how sure we are of the category) + 0.5. EFFICIENCY = 0.5 if none of the jargon matched (wanted or unwanted words), else EFFICIENCY = 1 |
| Filter Number: | 9 |
| Filter Reference: | INHERENT/CONTENT/ATTACHMENT/BODY |
| Description: | Increase/Decrease the relevance of an email given the content of the attachment |
| Filter WEIGHT: | 1 |
| RESULT Calculation: | Compare the subject words to the personal/position/corporate/industry jargons. Result is the average of the score given for each of the keywords. The score is defined by the rank (0: SPAM, 0.35: LOW, 0.65: MED, 1: HIGH) if existing. If not on their importance, compare to the range of words in the jargon. A weight of 3 is given to the personal jargon in the average, 2 for the position and the corporate jargon and 1 for the industry. |

TABLE 1-continued

INHERENT FILTERS DESCRIPTION FOR Emails

| | |
|---|---|
| EFFICIENCY Calculation: | Efficiency is based on the number of keywords matching compared to the average for the category (how many keywords are usually contained in the attachment content/how sure we are of the category) + 0.5. EFFICIENCY = 0.5 if none of the jargon matched (wanted or unwanted words), else EFFICIENCY = 1 |
| Filter Number: | 10 |
| Filter Reference: | INHERENT/EMAIL/ATTACHEMENT/TYPE |
| Description: | Increase/Decrease the relevance of an email given the type of attachment |
| Filter WEIGHT: | 0.5 |
| RESULT Calculation: | Compare the extension of the file to the most common extensions. RESULT is the average on the files. A score of 0 is given for media files (swf, avi, mp3, scr, jpg . . .), 0.5 for common (txt, html . . .) and 1 for project files (office, pdf, mpp . . .). Extensions are stored in a configuration file. |
| EFFICIENCY Calculation: | EFFICIENCY = 1 of the email contains attachment known, 0 if the attachment is unknown or if there is no attachment. |
| Filter Number: | 11 |
| Filter Reference: | INHERENT/CONVERSATION/PARTICIPANTS/INITIATOR |
| Description: | Increase/Decrease the relevance of an email if the initiator (i.e. creator) is known (included in the personal hierarchy) |
| Filter WEIGHT: | 0.5 |
| RESULT Calculation: | RESULT is obtained with the same calculation as the sender (see 1.2) |
| EFFICIENCY Calculation: | EFFICIENCY is obtained with the same calculation as the sender (see 1.2) |
| Filter Number: | 12 |
| Filter Reference: | INHERENT/CONVERSATION/INTENSITY |
| Description: | Increase the relevance of an email based on the number of email exchanged during the session (day). |
| Filter WEIGHT: | 0.5 |
| RESULT Calculation: | RESULT = 0.5 + a bonus increasing for each email related to the message during the session. Bonus is increased from 0.1 for each email above 2, up to RESULT = 1 |
| EFFICIENCY Calculation: | EFFICIENCY = 1, this filter is always active |
| Filter Number: | 13 |
| Filter Reference: | INHERENT/CONVERSATION/REPLY_FWD |
| Description: | Increase the relevance if the email is a reply or a forward related to another message. |
| Filter WEIGHT: | 0.5 |
| RESULT Calculation: | RESULT = 0.5 for a typical email, RESULT = 0.75 if the email is a forward and RESULT = 1 if the email is a reply. IDEALLY, based on the content, the filter should be able to identify how many times the email has been forwarded (if the information remains) and by whom. In that case the result might have a different behavior and the weight of the filter is increased. |
| EFFICIENCY Calculation: | EFFICIENCY = 1, this filter is always active |
| Filter Number: | 14 |
| Filter Reference: | INHERENT/CONTENT/EMAIL/IMPORTANCE |
| Description: | Increase/Decrease the relevance based on the sender assigned priority. |
| Filter WEIGHT: | 0.6 |
| RESULT Calculation: | RESULT = 1 if the email is marked as high priority, RESULT = 0.5 if the email is marked as normal, RESULT = 0 if the email is marked as low priority |
| EFFICIENCY Calculation: | EFFICIENCY = 1 if the Importance information is given in the email and EFFICIENCY = 0 if no information is contained. |
| Filter Number: | 15 |
| Filter Reference: | INHERENT/CONVERSATION/QUANTITY |
| Description: | Increase the relevance based on the number of email sent from the beginning of the conversation. |
| Filter WEIGHT: | 0.4 |
| RESULT Calculation: | RESULT = 0.5 + a bonus increasing for each email related to the message during the session. Bonus is increased from 0.1 for each email above the email conversation average until RESULT = 1 |
| EFFICIENCY Calculation: | EFFICIENCY = 1, this filter is always applicable |
| Filter Number: | 16 |
| Filter Reference: | INHERENT/CONTENT/EMAIL/DATE |
| Description: | Increase/Decrease the relevance of an email based on the time between the emission and the process |
| Filter WEIGHT: | 0.5 |
| RESULT Calculation: | Compare the date of emission with the current date, RESULT = 0 if the email was emitted more than 1 week ago, RESULT = 1 − 1/7 * n where n is the number of days spent before being processed if it was emitted less than 1 week ago. IDEALLY, the filter should identify if dates are defined in the content. If dates are still valuable, RESULT should be increased to 1. |

TABLE 1-continued

INHERENT FILTERS DESCRIPTION FOR Emails

| | |
|---|---|
| EFFICIENCY Calculation: | EFFICIENCY = 1, this filter is always applicable |
| Filter Number: | 17 |
| Filter Reference: | INHERENT/CONTENT/EMAIL/DELIVERY |
| Description: | Increase the relevance if the email is asking for a delivery receipt |
| Filter WEIGHT: | 0.4 |
| RESULT Calculation: | RESULT = 0.5 if no delivery receipt is asked, 1 if required |
| EFFICIENCY Calculation: | EFFICIENCY = 1, this filter is always applicable |
| Filter Number: | 18 |
| Filter Reference: | INHERENT/CONTENT/EMAIL/FORMATCHG |
| Description: | Increase the relevance if the email has changes in the formatting. |
| Filter WEIGHT: | 0.5 |
| RESULT Calculation: | RESULT = 0.5 if no changes occur, 1 if a word/sentence is in bold, color, highlighted or underlined compare to the rest of the document. |
| EFFICIENCY Calculation: | EFFICIENCY = 1, this filter is always applicable |

The illustrated embodiments of filters take a processed email as an input and return a score. The score is composed of 2 decimals in a range of 0 to 1: RESULT (i.e., indicating the importance of an email given the parameters filtered) and EFFICIENCY (i.e., indicating the surety and accuracy of the filter given the inputs).

I claim:

1. A method of adaptive, user-based prioritization of electronic messages comprising the steps of:

monitoring a message queue for receipt of an electronic message;

extracting statistical data associated with each message by parsing historical information and content analysis from the electronic message;

computing a message prioritization score for the extracted data through filter analysis, wherein the message prioritization score is based on an overall combined situational and inherent prioritization model that incorporates a situational prioritization value and an inherent prioritization value;

determining the situational prioritization value utilizing a first set of filters that implements a curve modeling a time-dependent equation representing the message's relative priority, where a weight is given to the importance of the type of curve in comparison to other curves, and efficiency representing the validity of the filter at a particular time, wherein the situational prioritization value is updated during a lifecycle of the electronic communication;

determining the inherent prioritization value utilizing a second set of filters that implements a first factor based on message attributes, message content analysis, and personal or organizational rules and policies, a second factor representing an importance of the message's context dimensions being analyzed, and a third factor representing an estimated accuracy and validity based on an amount of information for the message's dimension being analyzed, wherein the inherent prioritization value is further based on statistical data and context analysis;

associating the message prioritization score to the respective electronic message;

displaying a plurality of the electronic messages in order of the associated message prioritization score in a graphical user interface (GUI);

obtaining feedback from a user's interaction with the GUI to analyze user behavior so as to adapt the message parsing filter analysis;

reapplying the adapted message parsing and filter analysis to recalculate the message prioritization score;

wherein the message prioritization score is a function of Situational priority and Inherent priority according to the following derived formula:

Message priority=function (Situational, Inherent);

Message priority=function [Situational $f$(event dimensions), Inherent $f$(content dimensions)];

Situational $f$(event dimensions)=function (Relevance, Importance);

Inherent $f$(content dimensions)=function (Relevance, Importance);

therefore:

Message priority=function [Situational $f$(event dimensions $f$(Relevance, Importance)), Inherent $f$(content dimensions(Relevance, Importance))]; and calculating an overall priority value (PV) of a message based on the result of at least two independent adaptive filters, the PV being derived by the following:

Filter Values (Weight, Result, Efficiency)=f(Message)
Situational f(event dimensions)=f(Weight, Result, Efficiency)
Inherent f(content dimensions)=f(Weight, Result, Efficiency)
Importance=f(Weight, Result)
Relevance=f(Efficiency)

$$PV = \frac{\sum_{i=1}^{n} r_i e_i w_i}{\sum_{i=1}^{n} e_i w_i}$$

where:

(w) is an important weight given to the filter by the system,
(r) is the Result of the application of the filter to a message,
(e) is the Efficiency of that filter; and
PV is a decimal value between 0 and 1 which can be displayed as a ranking score to the user.

2. The method of claim 1, wherein the displaying step further comprises the step of listing summarized views of all electronic messages in the GUI.

3. The method of claim 1, further comprising the steps of:
- parsing the electronic message for at least one of a Security Context, and Inherent Metadata, and a Time factor;
- storing the results of the parsing in a repository of collected values; and
- applying the parsing results in the overall combined situational and inherent prioritization model;
- wherein a Security Context includes at least one of Source, Destination, Intermediate Paths, and Sensitivity;
- wherein an Inherent Metadata includes at least one of a Priority Classification, Category, Conversation, and Thread; and
- wherein Time Factor includes at least one of Sent, Received, Transactional Qualifications, and Acknowledgement.

4. The method of claim 1, wherein the content analysis of an internal unstructured message content involves a probabilistic correlation of all jargon files present in a user's system, and computed word scores from a given message to select the right jargon file.

5. The method of claim 4, further comprising the step of increasing the accuracy of the message summary by selecting the right jargon file as input for a Keyword(s) identification process.

6. The method of claim 4, wherein the selection of a jargon file defines a type of content that a message has, wherein different rules are applied to the electronic message depending on the selected jargon file.

7. The method of claim 4, wherein a user creates or edits the jargon files and the industry words and jargon within the files.

8. The method of claim 4, wherein centrally accessible predefined jargon files are provided, and wherein the centrally accessible jargon files can be continuously updated using data files.

9. The method of claim 4, wherein a hyperlink, a URL, or an email address is embedded in the electronic message, further comprising at least one of the following steps:
- parsing the text in the <a>tags;
- searching the "link", "site", "URL" that is referred by the link; and
- gathering information and performing content and context analysis on the information.

10. A graphical user interface (GUI) system wherein a plurality of electronic messages, each having a full content, are dynamically arranged in an order of prioritization based on an overall combined situational and inherent prioritization model,
- wherein the situational and inherent prioritization model incorporates a situational prioritization value utilizing a first set of filters that implements a curve modeling a time-dependent equation representing the message's relative priority, where a weight is given to the importance of the type of curve in comparison to other curves, and efficiency representing the validity of the filter at a particular time, wherein the situational prioritization value is updated during a lifecycle of the electronic communication, and
- wherein the situational and inherent prioritization model further incorporates an inherent prioritization value utilizing a second set of filters that implements a first factor based on message attributes, message content analysis, and personal or organizational rules and policies, a second factor representing an importance of the message's context dimension being analyzed, and a third factor representing an estimated accuracy and validity based on an amount of information for the message's dimension being analyzed, wherein the inherent prioritization value is further based on statistical data and context analysis of the electronic message;
- the electronic messages are displayed to the user with a summarized content and a security context of each of the plurality of electronic messages;
- wherein the overall combined situational and inherent prioritization model is a function of Situational priority and Inherent priority according to the following derived formula:

Message priority=function (Situational, Inherent);

Message priority=function [Situational $f$(event dimensions), Inherent $f$(content dimensions)];

Situational $f$(event dimensions)=function (Relevance, Importance);

Inherent $f$(content dimensions)=function (Relevance, Importance);

therefore:

Message priority=function [Situational $f$(event dimensions $f$(Relevance, Importance)), Inherent $f$(content dimensions(Relevance, Importance))]; and wherein an overall priority value (PV) of a message is calculated based on the result of at least two independent adaptive filters, the PV being derived by the following:
Filter Values (Weight, Result, Efficiency)=f(Message)
Situational f(event dimensions)=f(Weight, Result, Efficiency)
Inherent f(content dimensions)=f(Weight, Result, Efficiency)
Importance=f(Weight, Result)
Relevance=f(Efficiency)

$$PV = \frac{\sum_{i=1}^{n} r_i e_i w_i}{\sum_{i=1}^{n} e_i w_i}$$

where:
- (w) is an important weight given to the filter by the system,
- (r) is the Result of the application of the filter to a message,
- (e) is the Efficiency of that filter; and
- PV is a decimal value between 0 and 1 which can be displayed as a ranking score to the user.

11. The system of claim 10, wherein the summarized content comprises keyword(s), key hyperlinks, context information of the keywords, the key hyperlinks and key sentences.

12. The system of claim 11, wherein the context information is in the range of two to three words before and after the keyword.

13. The system of claim 11, wherein the context information is text structure including punctuation.

14. The system of claim 10, wherein the GUI appearance of the keywords is highlighted or a different style; and
- wherein the context is displayed as generalized text.

15. The system of claim 10, wherein the full content of a message is viewed by controlling a pointing device as it points to the summarized message content, resulting in the opening of a new window.

16. The system of claim 10, wherein a priority categorization icon visually indicates the overall priority categorization status of at least one of the plurality of electronic messages;

wherein the overall priority categorization is one of very high, high, medium, low, and someday.

17. The system of claim 10, wherein the overall priority score value of at least one of the plurality of electronic messages is visually represented as a ranking bar;
wherein the ranking bar changes color depending upon the prioritization categorization of the electronic message.

18. The system of claim 10, further comprising an interactive portion of the GUI as a user's work bench, wherein the summarized content is an open action item that is presented in a priority order customized to the user's work behavior.

19. The system of claim 18, wherein a message list view is updated after at least one of receiving an incoming message that underwent prioritization, and performing a search/sort operation.

20. The system of claim 18, wherein the work bench is cleared of a particular electronic message by activation of a "clear" button, resulting in the removal and marking of at least one selected summarized message.

21. The system of claim 18, wherein activation of a "fast action" button sends a predefined message response to a message sender, and the predefined message response contains scheduling preference of the user along with message reference information.

22. The system of claim 21, wherein a draft of the predefined message is customized to suit the user's work habits.

23. The system of claim 22, wherein activation of a Call-Me button causes the display of a pop-up window showing the time/date schedules for selection by the user;
wherein selection by the user indicates a time/date for phone contact by the sender of the electronic message, and an electronic message is sent to the sender containing a predefined text to the message sender.

24. The system of claim 22, wherein activation of a See-Me button causes the display of a pop-up window showing time/date schedules for selection by the user;
wherein selection by the user indicates a time/date for meeting with the sender of the electronic message, and an electronic message is sent to the sender containing a predefined text to the message sender.

25. The system of claim 10, wherein the user sets the prioritization of the electronic messages to be at lest one of high, medium, low, and spam.

26. The system of claim 10, wherein a user writes quick notes and clips them to the electronic messages while reviewing the message content.

27. The system of claim 16, wherein activation of a user-note button opens a pop-up note pad window for the entry of the notes, and where the notes can be edited or saved.

28. The system of claim 10, wherein the plurality of electronic messages are sorted and arranged based on overall priority scores, associated user notes, and conversation thread.

29. The system of claim 10, wherein a dynamic Summarization /re-summarization of the plurality of electronic messages is performed based on heuristic feedback from the user's interaction with the GUI.

30. The system of claim 10, wherein the GUI can be a pop window with customizable views that can stay open with other application windows simultaneously open on the user's personal computer or other computing devices.

* * * * *